United States Patent
Weaver et al.

(10) Patent No.: US 10,119,077 B2
(45) Date of Patent: Nov. 6, 2018

(54) PYROLIGNEOUS ACID PRODUCTION METHODS, PRODUCTS, AND SYSTEMS

(71) Applicant: Proton Power, Inc., Lenoir City, TN (US)

(72) Inventors: Samuel C. Weaver, Knoxville, TN (US); Priyanka Bhattacharya, Richmondhill, GA (US); Anthony Justin Lundy, Knoxville, TN (US); Joseph William Hargrove, Crossville, TN (US)

(73) Assignee: Proton Power, Inc, Lenoir City, TN (US)

( * ) Notice: Subject to any disclaimer, the term of this patent is extended or adjusted under 35 U.S.C. 154(b) by 0 days.

(21) Appl. No.: 15/424,835

(22) Filed: Feb. 4, 2017

(65) Prior Publication Data
US 2017/0267931 A1    Sep. 21, 2017

Related U.S. Application Data

(60) Provisional application No. 62/291,028, filed on Feb. 4, 2016.

(51) Int. Cl.
*C10C 5/00* (2006.01)
*C10B 53/02* (2006.01)

(52) U.S. Cl.
CPC .............. *C10C 5/00* (2013.01); *C10B 53/02* (2013.01); *Y02E 50/14* (2013.01)

(58) Field of Classification Search
CPC ........... C10C 5/00; C10B 53/02; Y02E 50/14
See application file for complete search history.

(56) References Cited

U.S. PATENT DOCUMENTS

| | | | | |
|---|---|---|---|---|
| 1,701,054 A | * | 2/1929 | Piron | C10K 1/102 423/245.2 |
| 1,784,270 A | * | 12/1930 | Coahran | C07C 51/573 203/33 |
| 1,839,735 A | * | 1/1932 | Bone | C01B 32/348 201/21 |
| 2,384,374 A | * | 9/1945 | Harrison | C07C 17/395 203/29 |
| 4,988,520 A | * | 1/1991 | Overton | A23K 40/20 426/454 |
| 2014/0352378 A1 | * | 12/2014 | Shearer | C05F 5/00 71/12 |

FOREIGN PATENT DOCUMENTS

JP    11-080743    * 3/1999

OTHER PUBLICATIONS

English translation of JP11-080743, pp. 1-9 (Year: 1999).*

* cited by examiner

*Primary Examiner* — Pancham Bakshi
*Assistant Examiner* — Mark R Luderer
(74) *Attorney, Agent, or Firm* — Wilson Patent Law, LLC

(57) ABSTRACT

Tools and techniques for pyroligneous acid production are provided in accordance with various embodiments. For example, a method of pyroligneous acid production is provided. The method may include: introducing a compound that includes at least carbon, oxygen, and hydrogen into a reaction chamber; heating the compound to a temperature of at least 700 degrees Celsius in the reaction chamber such that the compound reacts through a pyrolysis reaction to produce a liquid, where the liquid may include pyroligneous acid; and/or collecting the produced liquid. In some cases, the residence time of the compound may be less than 1,000 seconds. Temperatures above 1,000 degrees Celsius may be utilized in some cases. The produced liquid may be separated into an oil component and a water component that includes the pyroligneous acid. A lighter fraction may be distilled from the water component, where the lighter component includes the pyroligneous acid.

19 Claims, 15 Drawing Sheets

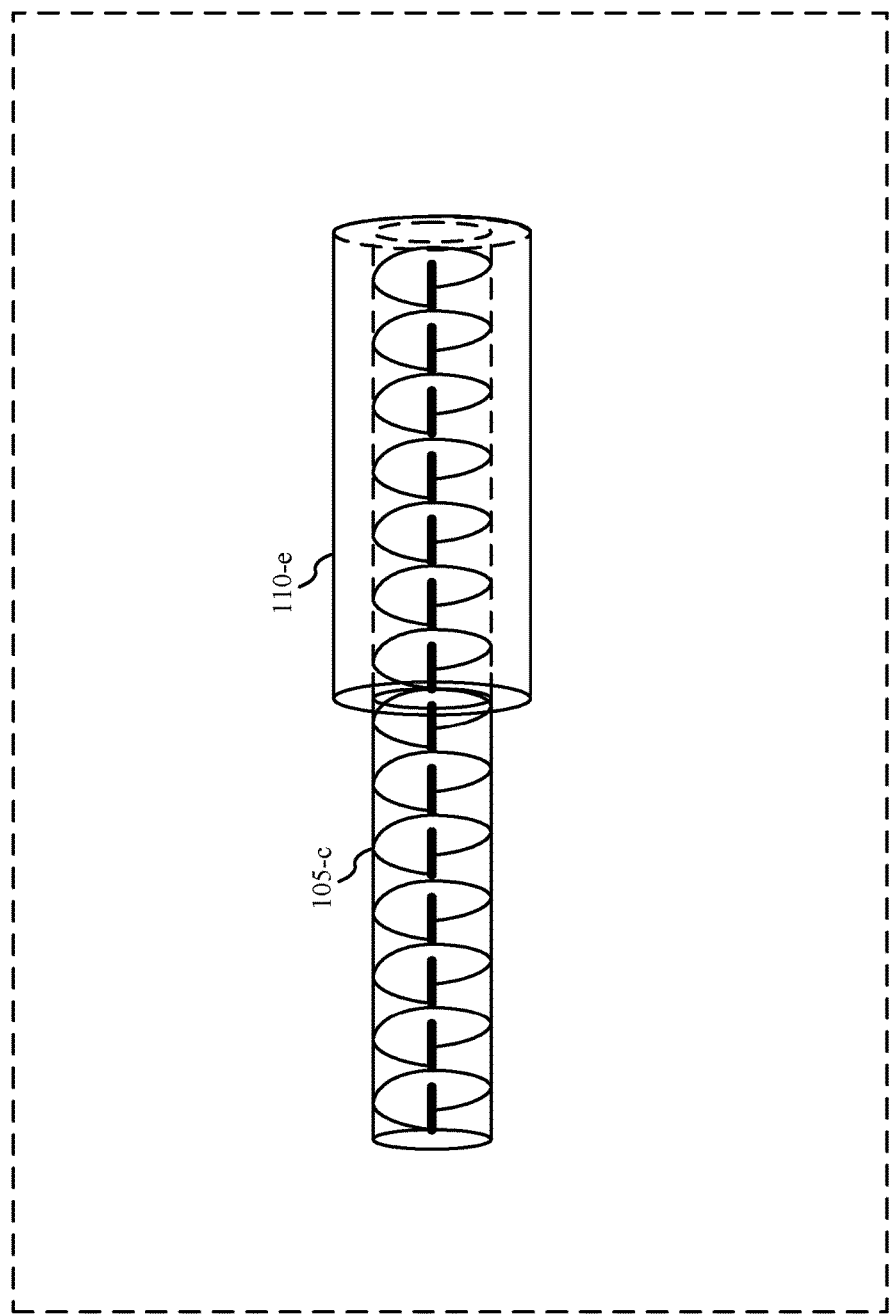

1

PYROLIGNEOUS ACID PRODUCTION METHODS, PRODUCTS, AND SYSTEMS

CROSS-REFERENCES TO RELATED APPLICATIONS

This application is a non-provisional patent application claiming priority benefit of U.S. provisional patent application Ser. No. 62/291,028, filed on Feb. 4, 2016 and entitled "PYROLIGNEOUS ACID PRODUCTION METHODS, PRODUCTS, AND SYSTEMS," the entire disclosure of which is herein incorporated by reference for all purposes.

BACKGROUND

Pyrolysis of biomass may produce of variety of products such as biochar, non-condensable gases, and/or condensable liquids. The condensable liquids may include components such as bio-oil.

Slow, low-temperature pyrolysis of biomass may produce liquid products that may include pyroligneous acid, also known as wood vinegar. Typically, pyrolysis temperatures around 400 degrees Celsius with residence times of hours to days may be utilized to produce wood vinegar. Wood vinegar may be utilized for a wide variety of purposes including, but not limited to, wood preservative, insect repellent or insecticide, herbicide, plant growth enhancer, and/or food flavoring, for example.

There may be a need for new tools and techniques for producing pyroligneous acid.

BRIEF SUMMARY

Tools and techniques for pyroligneous acid production are provided in accordance with various embodiments.

For example, a method of pyroligneous acid production is provided. The method may include: introducing a compound that includes at least carbon, oxygen, and hydrogen into a reaction chamber; heating the compound to a temperature of at least 700 degrees Celsius in the reaction chamber such that the compound reacts through a pyrolysis reaction to produce a liquid, where the liquid includes pyroligneous acid; and/or collecting the produced liquid. In some cases, the produced liquid may be referred to as system generated water.

Some embodiments include separating the produced liquid into at least an oil component and a water component, where the water component includes the pyroligneous acid. Some embodiments include distilling a lighter fraction from the water component; the lighter component may include the pyroligneous acid.

Some embodiments include distilling a heavier fraction from the water component. The heavier fraction may be burned or used as a binder in some cases.

Heating the compound in the reaction chamber may include utilizing a temperature of at least 800 degrees Celsius, of at least 900 degrees Celsius, of at least 1,000 degrees Celsius, or of at least 1,100 degrees Celsius. In some embodiments, the temperature is less than or equal to 1,100 degrees Celsius. In some embodiments, the compound has a residence time in the reaction chamber of between 10 seconds and 1,000 seconds. The compound may have a residence time in the reaction chamber of 300 seconds or less. The compound may have a residence time in the reaction chamber of 120 seconds or less.

In some embodiments, the pyrolysis reaction includes a hydrous pyrolysis reaction. In some embodiments, the compound includes a wet compound formed from mixing the compound with water outside the reaction chamber.

In some embodiments, the compound includes at least a biomass or a waste product.

Some embodiments include filtering the water component. Some embodiments include filtering the lighter fraction.

Some embodiments include drying the compound prior to introducing the compound into the reaction chamber. Drying the compound may reduce a water content of the compound to 10 percent or less, for example.

Some embodiments include adding a surfactant to the water component. Some embodiments include sparging the distilled lighter fraction, where the distilled lighter fraction includes the pyroligneous acid. Some embodiments include flaring a gas produced from sparging the distilled lighter fraction, where the gas includes at least benzene or toluene.

Some embodiments include a pyroligneous acid production system. The system may include a reaction chamber configured to heat a compound that includes at least carbon, oxygen, and hydrogen to a temperature of at least 700 degrees Celsius such that the compound reacts through a pyrolysis reaction to produce a liquid, where the liquid includes pyroligneous acid. They system may include one or more liquid collectors configured to collect liquid that includes the pyroligneous acid.

In some embodiments of the system, the one or more liquid collectors include a distiller. The one or more liquid collector may include an oil and water separator positioned between the reaction chamber and the distiller. The oil and water separator may be configured to separate the collected liquid into an oil component and a water component where the water component includes the pyroligneous acid. In some embodiments of the system, the distiller is configured to distill a lighter fraction from the water component, where the lighter fraction includes the pyroligneous acid.

Some embodiments of the system include a filter positioned between the reaction chamber and the distiller. Some embodiments include a filter is positioned between the oil and water separator and the distiller. Some embodiments include a filter positioned after the distiller.

Some embodiments of the system include a sparging tank configured to receive the lighter fraction, where the lighter fraction includes the pyroligneous acid. Some embodiments include a compressor coupled with the sparging tank.

Some embodiments of the system include a condenser configured to condense at least the lighter fraction distilled from the distiller. Some embodiments include a chiller coupled with the condenser.

Some embodiments of the system include a conveyor configured to convey the compound through the reaction chamber. The conveyer may include an auger. In some embodiments, the reaction chamber includes a tube furnace. In some embodiments of the system, at least the conveyor or the reaction chamber is configured such that the compound has a residence time in the reaction chamber between 10 seconds and 1,000 seconds. In some embodiments, at least the conveyor or the reaction chamber is configured such that the compound has a residence time in the reaction chamber of 300 seconds or less. In some embodiments, at least the conveyor or the reaction chamber is configured such that the compound has a residence time in the reaction chamber of 120 seconds or less.

In some embodiments of the system, the pyrolysis reaction includes a hydrous pyrolysis reaction. In some embodiments, the compound includes at least a biomass or a waste product.

Some embodiments of the system include a dryer configured to dry the compound prior to introduction into the reaction chamber. Some embodiments include a gas flare configured to flare a gas produced from the sparging tank.

Some embodiments include methods, systems, products, and/or devices as described in the detailed description and/or shown in the figures.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the different embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 2C shows a pyroligneous acid production system in accordance with various embodiments.

DETAILED DESCRIPTION

Figure 1A:
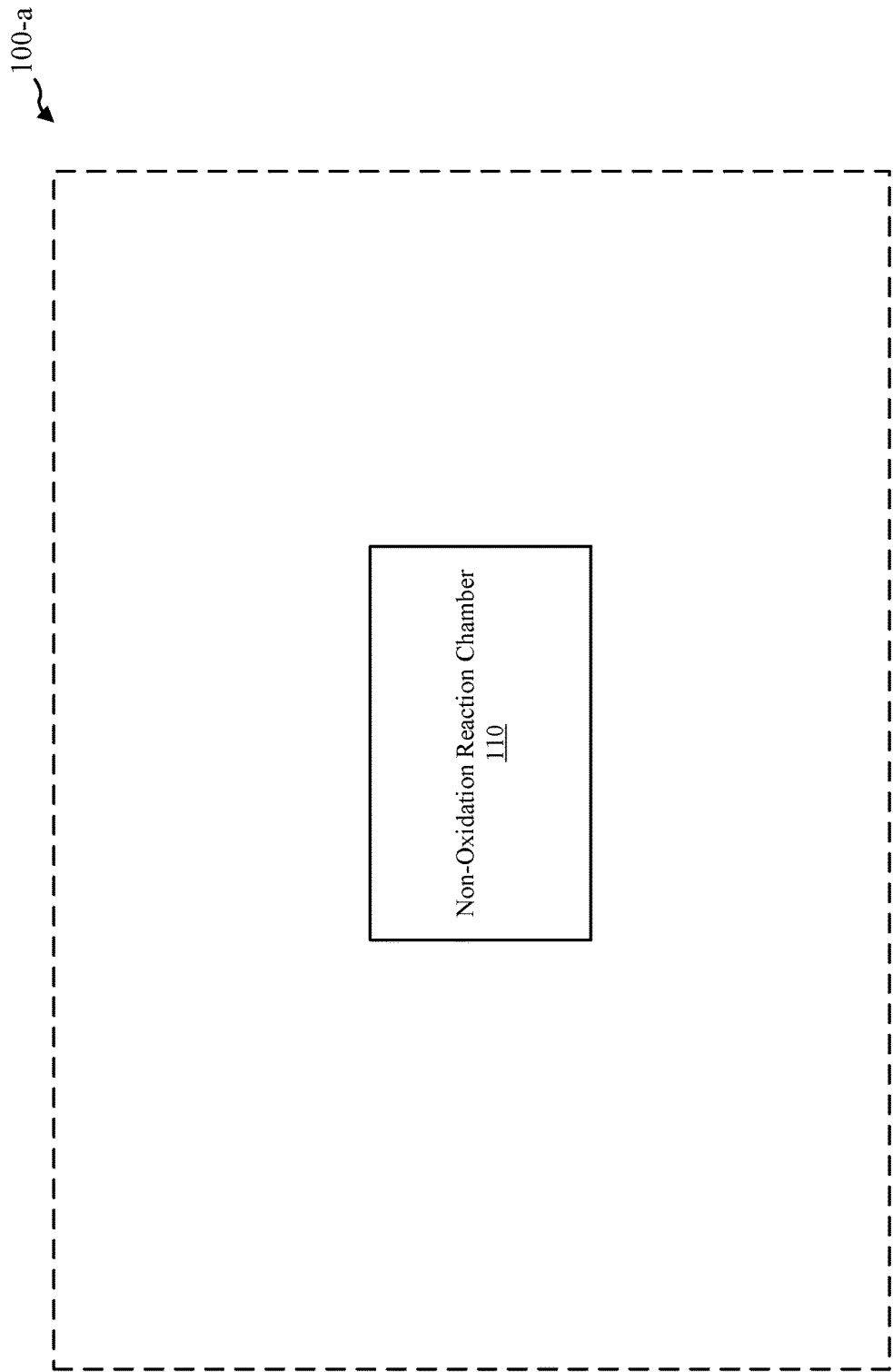
FIG. 1A shows a pyroligneous acid production system in accordance with various embodiments.

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments, it being understood that various changes may be made in the function and arrangement of elements without departing from the spirit and scope of the invention as set forth in the appended claims. Several embodiments are described herein, and while various features are ascribed to different embodiments, it should be appreciated that the features described with respect to one embodiment may be incorporated within other embodiments as well. By the same token, however, no single feature or features of any described embodiment should be considered essential to every embodiment, as other embodiments may omit such features.

Specific details are given in the following description to provide a thorough understanding of the embodiments. However, it will be understood by one of ordinary skill in the art that the embodiments may be practiced without these specific details. For example, systems, networks, processes, and other elements in embodiments may be shown as components in block diagram form in order not to obscure the embodiments in unnecessary detail. In other instances, well-known processes, structures, and techniques may be shown without unnecessary detail in order to avoid obscuring the embodiments.

Also, it is noted that individual embodiments may be described as a process which may be depicted as a flowchart, a flow diagram, a structure diagram, or a block diagram. Although a flowchart may describe the operations as a sequential process, many of the operations can be performed in parallel or concurrently. In addition, the order of the operations may be rearranged. A process may be terminated when its operations are completed, but could also comprise additional operations not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

Furthermore, embodiments may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Embodiments may include different tools and techniques for producing pyroligneous acid. Embodiments in general may utilize a non-oxidation process, such as pyrolysis, to produce gases and/or liquids that may be used to make different end products such as synfuels, electricity, and/or hydrogen. For example, pyrolysis may generally involve the process of thermally decomposing organic matter (such as biomass or other carbon, oxygen, and hydrogen compounds (COH compounds)) in a limited oxygen environment or without the use of oxygen as a separate compound in the reaction. For example, pyrolysis may include the process of breaking down biomass using heat in the absence of oxygen in some cases.

Typically, slow, low-temperature pyrolysis of biomass may have been used to produce liquid products that may include pyroligneous acid, also known as wood vinegar. Typically, pyrolysis temperatures around 400 degrees Celsius with residence times of hours to days may have been utilized to produce pyroligneous acid. Pyroligneous acid may be utilized for a wide variety of purposes such as wood preservative, insect repellent or insecticide, herbicide, plant growth enhancer, and/or food flavoring, for example. Pyroligneous acid may be referred to as wood vinegar, liquid wood, and/or pyrolysis liquid.

Tools and techniques in accordance with various embodiments are provided for pyroligneous acid production through pyrolysis or non-oxidation reactions in general of COH compounds. Some embodiments may utilize temperatures of 1,000-1,100 degrees Celsius, which may be much higher than most other pyrolysis systems that may typically operate in the 400-500 degrees Celsius range to produce pyroligneous acid. Some embodiments may operate at a temperature of at least 700 degrees Celsius, 800 degrees Celsius, 900 degrees Celsius, 1,000 degrees Celsius, or 1,100 degrees Celsius. In some embodiments, the compound has a residence time between 10 seconds and 1,000 seconds. The compound may have a residence time of 300 seconds or less in some cases. The compound may have a residence time of 120 seconds or less in some cases. These residence times may typically be significantly less than the hours or even days of heating involved with slow pyrolysis that may have generally been utilized to produce pyroligneous acid.

As discussed in further detail herein, the produced pyroligneous acid may be part of a lighter fraction that includes a mixture of water and various oxygenated chemicals that may be derived from thermal decomposition of COH compounds in the absence of air or oxygen. The liquids produced in accordance with various embodiments may have benefits over other forms of produced pyroligneous acid. For example, the produced liquids may include less cyanide then other forms of produced pyroligneous acid. For example, the amount cyanide may be less than 50 ppm; in some produced lighter fractions in accordance with various embodiments, the amount of cyanide is less than 20 ppm. In some embodiments, the amount of cyanide may be between 5 and 30 ppm. In some embodiments, cyanide that may be produced may be concentrated in a higher fraction through distillation, which may result in a lighter fraction with less or no detectable cyanide.

Other general characteristics of the pyroligneous acid, which may be part of the lighter fraction, produced in accordance with various embodiments include the following. Some embodiments include pH between 2.2 and 3.5. Some embodiments include total acid number between 20 and 35 mgKOH/g of sample. Some embodiments may have a density of approximately 1.01 gm/l. Some embodiments may have a flash point greater than 100 degrees Celsius. Some embodiments may have a total suspended solid content of less than 25 ppm.

Merely by way of example, a chemical composition of some embodiments of the lighter fraction, with respect to mass percentage, may be the following: 94-98% water, 0.2-0.4% acetic acid, 0.1-0.3% other acids, 1-2.5% furfural, 0.6-1.2% other aldehydes/ketones, 1-2% phenol and substituted phenols, 0.08% or lower other oxygenated compounds, and/or 0.01% or less of alkanes/alkenes. PAH and/or BTEX levels may not be detected. Other embodiments may include other chemical compositions.

Some embodiments may also produce a heavier fraction. The heavier fraction may be referred to as pyrolysis liquid bottoms, pyroligneous acid bottoms, wood vinegar distillate bottoms, and/or liquid wood bottoms, for example. The heavier fraction may include a mixture of water and various oxygenated chemicals that may be derived by the thermal decomposition of different compounds in the absence of air or oxygen, for example. Some embodiments of the heavier fraction include pH between 2.2 and 3.5. Some embodiments include total acid number between 20 and 35 mgKOH/g of sample. Some embodiments may have a density of approximately 1.01 gm/l. Some embodiments may have a flash point greater than 100 degrees Celsius. Some embodiments may have a total suspended solid content between 1,200 and 2,000 mg/L. Some embodiments may include cyanide between 300 and 1,000 ppm.

Merely by way of example, a chemical composition of some embodiments of the heavier fraction, with respect to mass percentage, may be the following: 92-98% water, 0.1% or less of acetic acid, 0.5% or less of other acids, 0.06% or less of furfural, 0.1-1.0% other aldehydes/ketones, 0.9-1.5% phenol and substituted phenols, 0.5-2.5% other oxygenated compounds, and/or undetectable amounts of alkanes/alkenes. PAH and/or BTEX levels may not be detected. Other embodiments may include other chemical compositions.

The produced lighter fraction and/or heavier fraction may be utilized for a variety of purposes. For example, the lighter fraction may be utilized as food flavoring, such as liquid smoke. The lighter fraction may be utilized for other purposes including, but not limited to, plant food, herbicide, insecticide, insect repellent, wood preservative, and/or feedstuff amendment. The lighter fraction may be diluted in some cases for different applications. For example, the lighter fraction may be diluted 1 to 1 or 1 to 100, though other dilution factors may be utilized. The heavier fraction may be utilized for a variety of purposes including, but limited to, a binder, a plant food, and/or insecticide. The heavier fraction may be diluted in some applications. For example, dilutions of 1 to 100 may be utilized, though other dilutions factors may be utilized.

In some embodiments, a COH compound, such as biomass, may be transported to a reaction or heating chamber by an auger. The reaction or heating chamber may be configured as a tube in some cases. The reaction chamber may be heated to cause a non-oxidation reaction such as a pyrolysis reaction. This auger-based approach combined with temperature controls that may maintain a constant and/or controlled temperature over the length of the reaction chamber may help ensure that the COH compound, such as biomass, may consistently flows through the reaction or heating chamber. This may help achieve a consistent residence time and/or consistent heat transfer to the COH compound. This may mean that all or most of the COH compound may receive an equal opportunity for the full conversion process to happen.

A general overview of a system 100-*a* for pyroligneous acid production in accordance with various embodiments is provided with FIG. 1A. System 100-*a* may include a non-oxidation reaction chamber 110. The specific component(s) shown are intended merely to be illustrative. Some embodiments may include other components, not necessarily shown, that may be utilized. Some, but not all of these variants, may be noted in the description that follows.

In some embodiments, the non-oxidation reaction chamber 110 may be configured for pyroligneous acid production. A COH compound may be introduced into reaction chamber 110; the COH may be referred to as a compound that includes carbon, oxygen, and hydrogen. The non-oxidation reaction chamber 110 may be configured to heat the COH compound to a temperature of at least 700 degrees Celsius such that the COH compound reacts through a non-oxidation reaction to produce the pyroligneous acid. The produced pyroligneous acid may be collected after it is produced in the non-oxidation reaction chamber 110. A liquid that may include the pyroligneous acid may be produced through the non-oxidation reaction. The liquid may be referred to as system generated water in some cases.

In some embodiments, the non-oxidation reaction includes a pyrolysis reaction. The non-oxidation reaction may include a hydrous pyrolysis reaction. The non-oxidation reaction may include a reduced oxygen reaction.

In some embodiments, the temperature utilized is at least 800 degrees Celsius, 900 degrees Celsius, 1,000 degrees Celsius, or 1,100 degrees Celsius. In some embodiments, the utilized temperature may be less than or equal to 1,100 degrees Celsius; for example, a range of temperatures between 700 or 800 degrees Celsius and 1,100 degrees Celsius may be utilized.

In some embodiments, the compound has a residence time in the reaction chamber 110 of between 10 seconds and 1,000 seconds. The compound may have a residence time in the reaction chamber 110 of 300 seconds or less. The compound may have a residence time in the reaction chamber 110 of 120 seconds or less.

In some embodiments, the compound includes at least a biomass or a waste product. Some embodiments may utilize COH compounds, such as cellulose, lignin, and/or hemicellulose, which may be found in biomass. Many biomass feedstocks may have one or more of a mixture of cellulose, lignin, hemicellulose, and/or trace minerals in their component materials. Some embodiments may utilize feedstocks that include other COH compounds, such as paper waste, sawdust of a wide variety of wood types, cardboard, hay, straw, switchgrass, municipal solid waste, sanitized waste, demolition and construction wood waste; these various feedstocks may generally be referred to waste products. In general, materials that may include a COH compound may be utilized in different embodiments.

In some embodiments, heating the COH compound may be performed within a tube furnace. The tube furnace may include a material composition that includes at least a high-nickel metal alloy. Some embodiments include using an auger to effect continuous motion the COH compound into and through the tube furnace and wherein the COH compound is in a solid phase. In some embodiments, the auger includes a composition that includes at least a high-nickel metal alloy. In some embodiments, the auger includes at least a single blade pitch for multiple blades. In some embodiments, the auger includes multiple blades with multiple blade pitches.

In some embodiments, the COH compound includes a wet COH compound. Heating the COH compound may include reacting water from the wet COH compound with the COH compound to produce at least the produced pyroligneous acid. Some embodiments include transferring the wet COH compound to a reaction chamber before heating the wet COH compound.

Figure 1B:
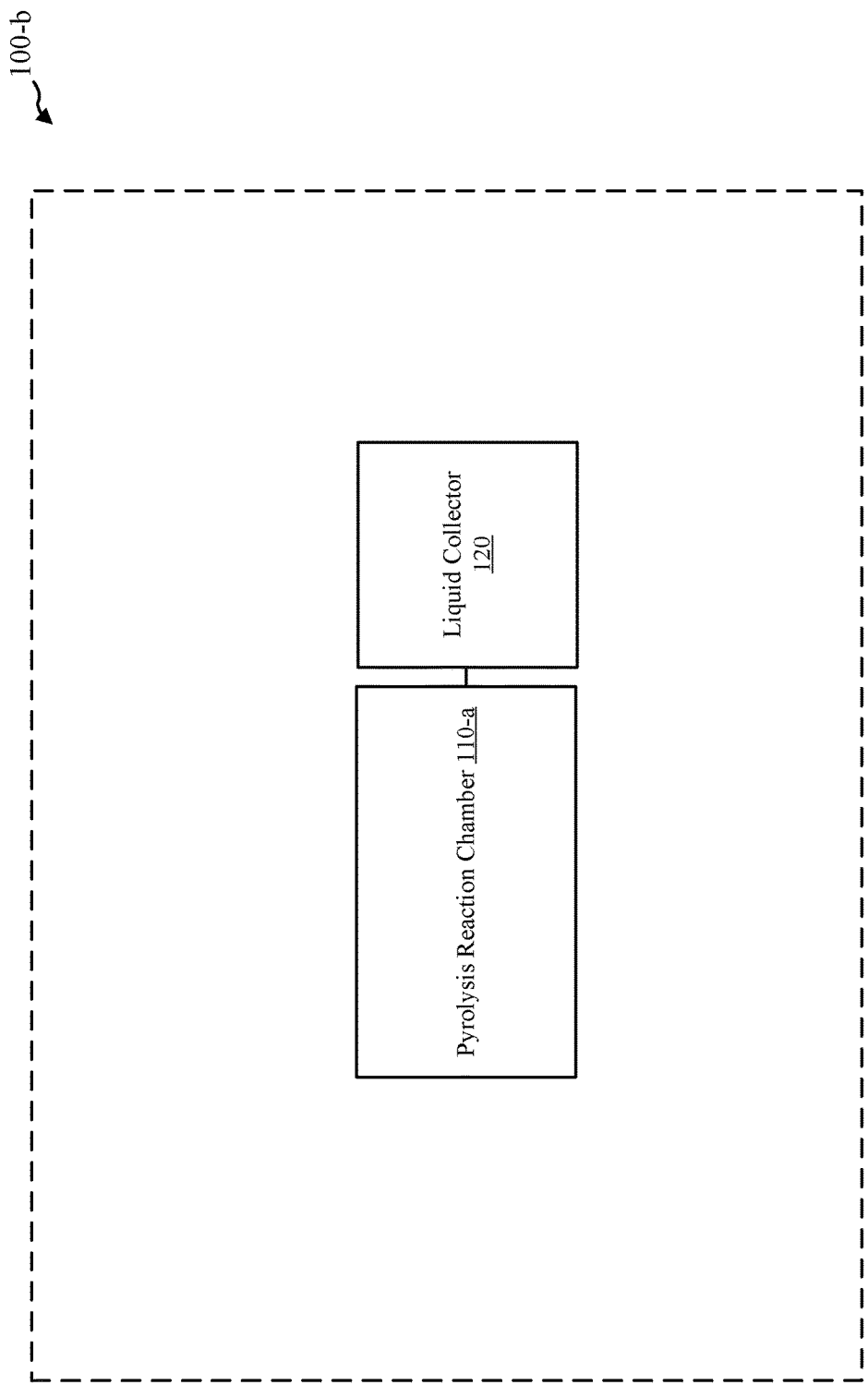
FIG. 1B shows a pyroligneous acid production system in accordance with various embodiments.

Another system 100-*b* for pyroligneous acid production in accordance with various embodiments is provided with FIG. 1B. System 100-*b* may be an example of system 100-*a* of FIG. 1A. System 100-*b* may include a pyrolysis reaction chamber 110-*a*, which may be an example of the non-oxidation reaction chamber 110 of FIG. 1A. System 100-*b* may include a liquid collector 120, which may be utilized to collect liquid produced by the pyrolysis reaction chamber 110-*a*. The collected liquid may include pyroligneous acid. The specific component(s) shown are intended merely to be illustrative. Some embodiments may include other components, not necessarily shown, that may be utilized. Some, but not all of these variants, may be noted in the description that follows.

In some embodiments, the pyrolysis reaction chamber 110-*a* may be configured for pyroligneous acid production utilizing biomass or a waste stream (in general, a COH compound). The biomass or waste stream may be introduced into the pyrolysis reaction chamber 110-*a*. For example, the pyrolysis reaction chamber 110-*a* may be configured to heat the biomass or waste stream to a temperature of at least 700 degrees Celsius such that the biomass or waste stream reacts through a pyrolysis reaction to produce the pyroligneous acid. The produced pyroligneous acid may be collected after it is produced in the pyrolysis reaction chamber 110-*a* utilizing liquid collector 120. In general, a liquid that may include the pyroligneous acid may be produced through the pyrolysis reaction. The liquid may be referred to as system generated water in some cases.

In some embodiments, the temperature in the pyrolysis reaction chamber 110-*a* utilized to induce the pyrolysis reaction is at least 800 degrees Celsius, 900 degrees Celsius, 1,000 degrees Celsius, or 1,100 degrees Celsius. In some embodiments, the utilized temperature may be less than or equal to 1,100 degrees Celsius; for example, a range of temperatures between 700 or 800 degrees Celsius and 1,100 degrees Celsius may be utilized. The pyrolysis reaction may include a hydrous pyrolysis reaction. In some embodiments, the biomass or waste stream may be made wet through mixing the biomass or waste stream with water outside the pyrolysis reaction chamber 110-*a*.

In some embodiments, the biomass or waste stream has a residence time in the reaction chamber 110-*a* of between 10 seconds and 1,000 seconds. The biomass or waste stream may have a residence time in the reaction chamber 110-*a* of 300 seconds or less. The biomass or waste stream may have a residence time in the reaction chamber 110-*a* of 120 seconds or less.

In some cases, the liquid collector 120 may include an oil and water separator that may be configured to separate the produced liquid into at least an oil component and a water component, where the water component includes the pyroligneous acid. The oil component may include oil and/or sludge in some cases.

In some embodiments, the liquid collector 120 includes a distiller or extraction device that may be configured to distill or extract a lighter fraction from the water component where the lighter component includes the pyroligneous acid. In some cases, the distillation device may include a fractional distillation device. In some cases, the extraction device includes a solvent extraction device.

In some embodiments, the liquid collector 120 configured as a distiller may be configured for separating a heavier fraction from the water component. The heavier fraction may be burned or used as a binder in some cases.

In some embodiments, the water component and/or lighter fraction may be filtered before and/or after the liquid collector 120. For example, a filter may be positioned between the reaction chamber and a distiller as liquid collector 120. In some embodiments, a filter may be positioned between an oil and water separator and a distiller, where both may be considered liquid collectors 120. In some embodiments, a filter may be positioned after a distiller as liquid collector 120. The filters may be utilized to remove particulates from the water component and/or lighter fraction, for example.

As noted, the produced pyroligneous acid may be part of a lighter fraction. The lighter fraction may include a mixture of water and various oxygenated chemicals that may be derived from thermal decomposition of COH compounds in the absence of air or oxygen. The liquids produced in accordance with various embodiments may have benefits over other forms of produced pyroligneous acid. For example, the produced liquids may include less cyanide then other forms of produced pyroligneous acid. For example, the amount cyanide may be less than 50 ppm; in some produced lighter fractions in accordance with various embodiments, the amount of cyanide is less than 20 ppm. In some embodiments, the amount of cyanide may be between 5 and 30 ppm. In some embodiments, cyanide that may be produced may be concentrated in a higher fraction through distillation, which may result in a lighter fraction with less or no detectable cyanide.

Other general characteristics of the pyroligneous acid, which may be part of the lighter fraction, produced in accordance with various embodiments include the following. Some embodiments include pH between 2.2 and 3.5. Some embodiments include total acid number between 20 and 35 mgKOH/g of sample. Some embodiments may have a density of approximately 1.01 gm/l. Some embodiments may have a flash point greater than 100 degrees Celsius. Some embodiments may have a total suspended solid content of less than 25 ppm.

Merely by way of example, a chemical composition of some embodiments of the lighter fraction, with respect to mass percentage, may be the following: 94-98% water, 0.2-0.4% acetic acid, 0.1-0.3% other acids, 1-2.5% furfural, 0.6-1.2% other aldehydes/ketones, 1-2% phenol and substituted phenols, 0.08% or lower other oxygenated compounds, and/or 0.01% or less of alkanes/alkenes. PAH and/or BTEX levels may not be detected. Other embodiments may include other chemical compositions.

As noted, some embodiments may also produce a heavier fraction. The heavier fraction may be referred to as pyrolysis liquid bottoms, pyroligneous acid bottoms, wood vinegar distillate bottoms, and/or liquid wood bottoms, for example. The heavier fraction may include a mixture of water and various oxygenated chemicals that may be derived by the thermal decomposition of different compounds in the absence of air or oxygen, for example. Some embodiments of the heavier fraction include pH between 2.2 and 3.5. Some embodiments include total acid number between 20 and 35 mgKOH/g of sample. Some embodiments may have a density of approximately 1.01 gm/l. Some embodiments may have a flash point greater than 100 degrees Celsius. Some embodiments may have a total suspended solid content between 1,200 and 2,000 mg/L. Some embodiments may include cyanide between 300 and 1,000 ppm.

Merely by way of example, a chemical composition of some embodiments of the heavier fraction, with respect to mass percentage, may be the following: 92-98% water, 0.1% or less of acetic acid, 0.5% or less of other acids, 0.06% or less of furfural, 0.1-1.0% other aldehydes/ketones, 0.9-1.5% phenol and substituted phenols, 0.5-2.5% other oxygenated compounds, and/or undetectable amounts of alkanes/alkenes. PAH and/or BTEX levels may not be detected. Other embodiments may include other chemical compositions.

The produced lighter fraction and/or heavier fraction may be utilized for a variety of purposes. For example, the lighter fraction may be utilized as food flavoring, such as liquid smoke. The lighter fraction may be utilized for other purposes including, but not limited to, plant food, herbicide, insecticide, insect repellent, wood preservative, and/or feedstuff amendment. The lighter fraction may be diluted in some cases for different applications. For example, the lighter fraction may be diluted 1 to 1 or 1 to 100, though other dilution factors may be utilized. The heavier fraction may be utilized for a variety of purposes including, but limited to, a binder, a plant food, and/or insecticide. The heavier fraction may be diluted in some applications. For example, dilutions of 1 to 100 may be utilized, though other dilutions factors may be utilized.

Figure 1C:
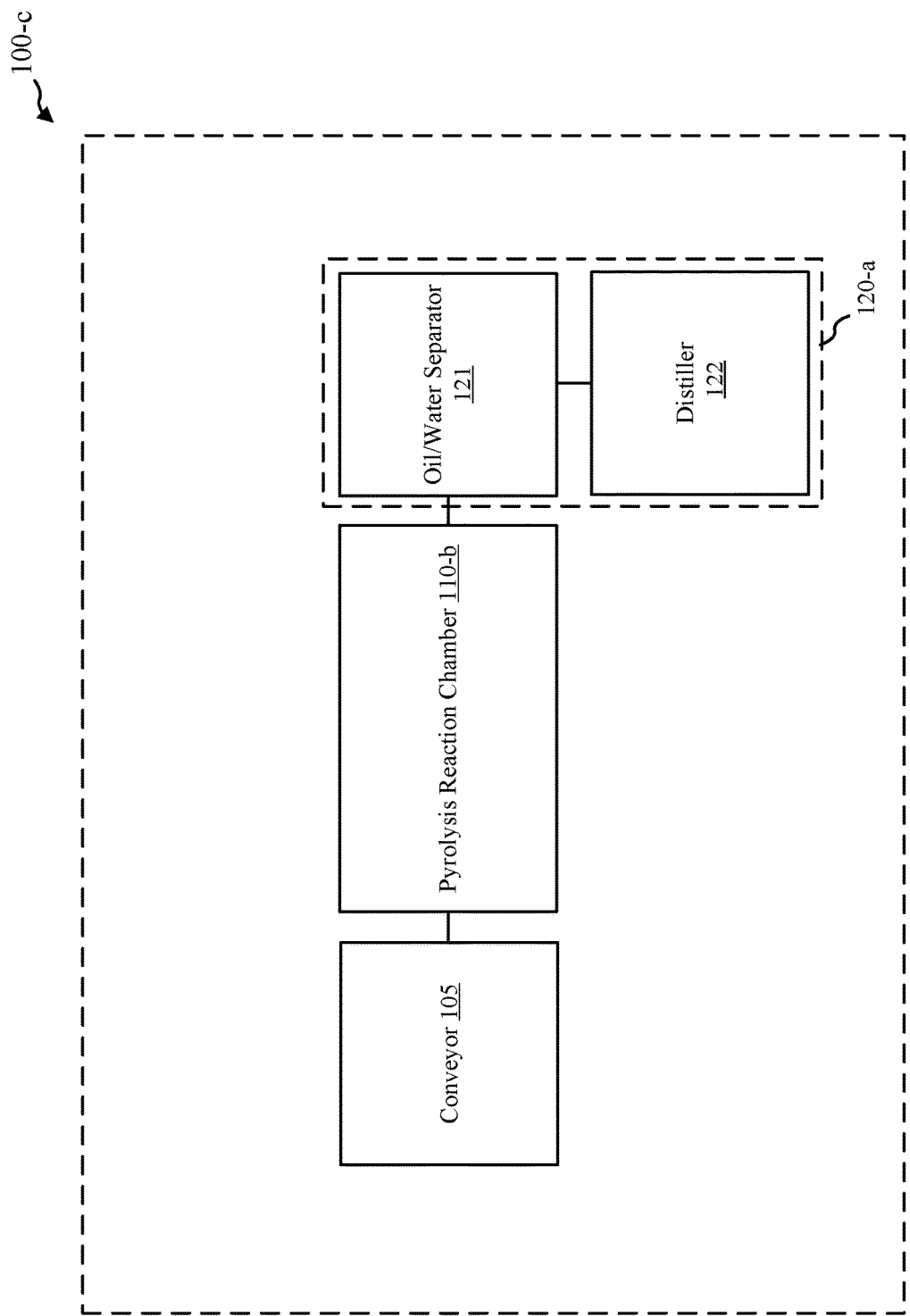
FIG. 1C shows a pyroligneous acid production system in accordance with various embodiments.

Another system 100-*c* for pyroligneous acid production in accordance with various embodiments is provided with FIG. 1C. System 100-*c* may be an example of system 100-*a* of FIG. 1A and/or system 100-*b* of FIG. 1B. System 100-*c* may include a pyrolysis reaction chamber 110-*b*, which may be an example of the non-oxidation reaction chamber 110 of FIG. 1A or the pyrolysis reaction chamber 110-*a* of FIG. 1B. System 100-*c* may include an oil and water separator 130 and/or a distiller 120-*a*. The oil and water separator 121 and/or the distiller 122 may be examples of aspects of liquid collector 120-*a*, which may be examples of liquid collector 120 of FIG. 1B. System 100-*c* may include a conveyor 105, which may be utilized to convey a COH compound into pyrolysis reaction chamber 110-*b*. The specific component(s) shown are intended merely to be illustrative. Some embodiments may include other components, not necessarily shown, that may be utilized. Some, but not all of these variants, may be noted in the description that follows.

In general, the pyrolysis reaction chamber 110-*b* may be configured for pyroligneous acid production through heating a COH compound to at least 700 degrees Celsius, 800 degrees Celsius, 900 degrees Celsius, 1,000 degrees Celsius, or 1,100 degrees Celsius. In some embodiments, the utilized temperature may be less than or equal to 1,100 degrees Celsius; for example, a range of temperatures between 700 or 800 degrees Celsius and 1,100 degrees Celsius may be utilized. A pyrolysis reaction may produce the pyroligneous acid. The produced pyroligneous acid, as system generated water in some cases, may be collected after it is produced in the pyrolysis reaction chamber 110-*b* utilizing the oil and water separator 121. The COH may have a residence time in the pyrolysis reaction chamber 110-*b* of between 10 seconds and 1,000 seconds. The COH compound may have a residence time in the pyrolysis reaction chamber 110-*b* of 300 seconds or less. The COH compound may have a residence time in the pyrolysis reaction chamber 110-*b* of 120 seconds or less.

In some cases, the oil and water separator 121 may be configured to separate the pyroligneous acid bearing liquid into at least an oil component and a water component, where the water component includes the pyroligneous acid. The oil component may also include sludge. The water component may go to the distiller 122. Distiller 122 may be a fraction distiller. In some embodiments, the distiller 122 may be configured for separating a heavier fraction from the water component. The heavier fraction may be burned or used as a binder in some cases. Some embodiments may utilize the distiller 122 to separate a lighter fraction from the water component, where the lighter fraction includes the pyroligneous acid.

Conveyor 105 may include a variety of different types of conveyors, including, but not limited to augers, conveyor belts, chutes, and/or hoppers. Some embodiments include using an auger as the conveyor 105, in particular, to affect continuous motion the COH compound into and through the pyrolysis reaction chamber 110-b and where the COH compound may be in a solid phase. In some embodiments, the auger includes a composition that includes at least a high-nickel metal alloy. In some embodiments, the auger includes at least a single blade pitch for multiple blades. In some embodiments, the auger includes multiple blades with multiple blade pitches.

Figure 1D:
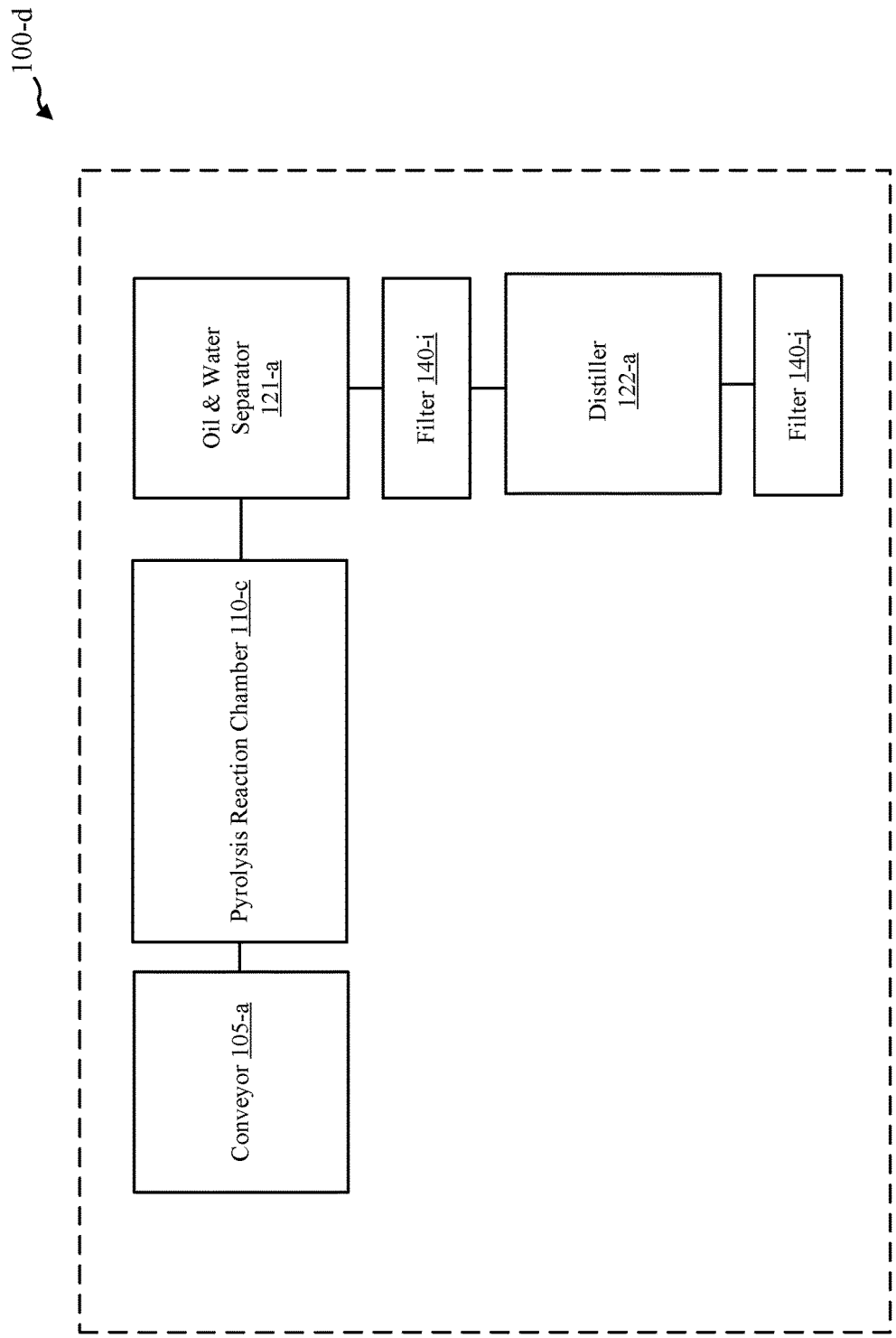
FIG. 1D shows a pyroligneous acid production system in accordance with various embodiments.

Another system 100-d for pyroligneous acid production in accordance with various embodiments is provided with FIG. 1D. System 100-d may be an example of system 100-a of FIG. 1A, system 100-b of FIG. 1B, and/or system 100-c of FIG. 1C. System 100-d may include a pyrolysis reaction chamber 110-c, which may be an example of the non-oxidation reaction chamber 110 of FIG. 1A, the pyrolysis reaction chamber 110-a of FIG. 1B, and/or the pyrolysis reaction chamber 110-b of FIG. 1C. System 100-d may include an oil and water separator 121-a, which may be an example of the oil and water separator 121 of FIG. 1C. System 100-d may include a distiller 122-a, which may be an example of distiller 120 of FIG. 1C. The oil and water separator 121-a and/or the distiller 122-a may be examples of aspects of the liquid collector 120 of FIG. 1B. System 100-c may include a conveyor 105-a, which may be an example of conveyor 105 of FIG. 1C. The specific component(s) shown are intended merely to be illustrative. Some embodiments may include other components, not necessarily shown, that may be utilized. Some, but not all of these variants, may be noted in the description that follows.

In system 100-d, filters 140-i and/or 140-j may be utilized. Filter 140-i may be utilized to filter a water component, which may include pyroligneous acid, before it may be introduced into distiller 122-a. Filter 140-j may be utilized to filter a lighter fraction, which may include pyroligneous acid after it is removed from distiller 122-a.

Figure 1E:
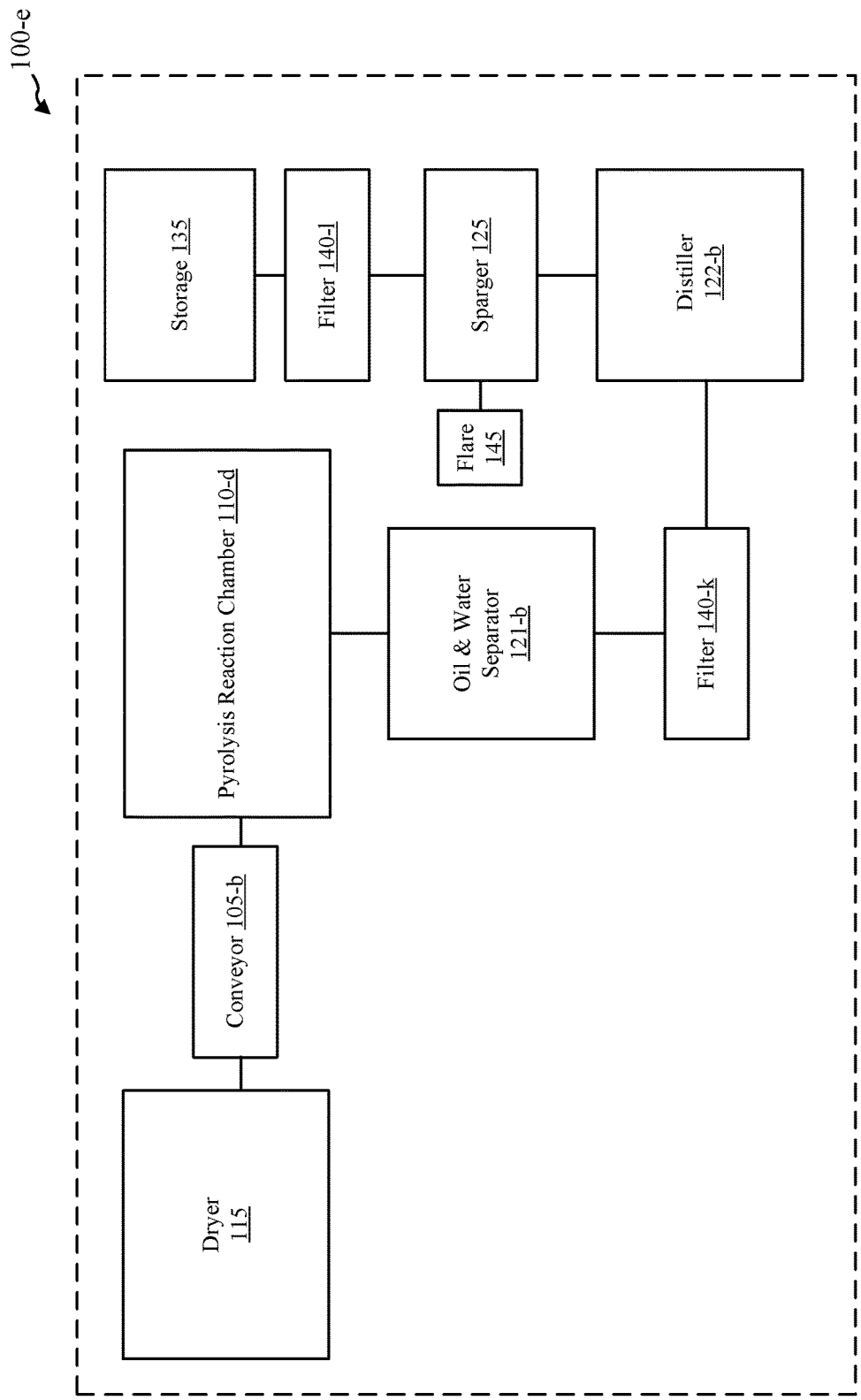
FIG. 1E shows a pyroligneous acid production system in accordance with various embodiments.

Another system 100-e for pyroligneous acid production in accordance with various embodiments is provided with FIG. 1E. System 100-e may be an example of system 100-a of FIG. 1A, system 100-b of FIG. 1B, system 100-c of FIG. 1C, and/or system 100-d of FIG. 1D. System 100-e may include a pyrolysis reaction chamber 110-d, which may be an example of the non-oxidation reaction chamber 110 of FIG. 1A, the pyrolysis reaction chamber 110-a of FIG. 1B, the pyrolysis reaction chamber 110-b of FIG. 1C, and/or pyrolysis reaction chamber 110-c of FIG. 1D. System 100-e may include an oil and water separator 121-b, which may be an example of the oil and water separator 121 of FIG. 1C and/or oil and water separator 121-a of FIG. 1D. System 100-e may include a distiller 122-b, which may be an example of distiller 122 of FIG. 1C and/or distiller 122-a of FIG. 1D. The oil and water separator 121-b and/or the distiller 122-b may be examples of aspects of the liquid collector 120 of FIG. 1B. System 100-e may include a conveyor 105-b, which may be an example of conveyor 105 of FIG. 1C and/or conveyor 105-a of FIG. 1D. System 100-e may include additional components such as dryer 115, sparger 125, flarer 145, and/or storage 135. System 100-e may include one or more filters, such as filter 140-k and/or filter 140-l. The specific component(s) shown are intended merely to be illustrative. Some embodiments may include other components, not necessarily shown, that may be utilized. Some, but not all of these variants, may be noted in the description that follows.

System 100-e may be configured such that pyrolysis reaction chamber 110-d heats a compound that includes at least carbon, oxygen, and hydrogen to a temperature of at least 700 degrees Celsius such that the compound reacts through a pyrolysis reaction to produce a liquid, where the liquid includes pyroligneous acid. One or more liquid collectors, such as oil and water separator 121-b and/or distiller 122-b, may be configured to collect the liquid that includes the pyroligneous acid.

In some embodiments of the system 100-e, the oil and water separator 121-b is positioned between the pyrolysis reaction chamber 110-d and the distiller 122-b. The oil and water separator 121-b may be configured to separate the collected liquid into an oil component and a water component, where the water component includes the pyroligneous acid. The oil component may also include sludge or be referred to as a sludge component and/or oil and sludge component. In some embodiments of the system 110-e, the distiller 122-b is configured to distill a lighter fraction from the water component, where the lighter fraction includes the pyroligneous acid.

Some embodiments of the system 100-e include a filter 140-k positioned between the pyrolysis reaction chamber 110-d and the distiller 122-b. Some embodiments include the filter 140-k is positioned between the oil and water separator 121-b and the distiller 122-b. Some embodiments include filter 140-l positioned after the distiller 122-b.

Some embodiments of the system 100-e include a sparger 125 (which may be referred to as a sparging tank in some cases) that may be configured to receive the lighter fraction, where the lighter fraction includes the pyroligneous acid. Some embodiments include a compressor coupled with the sparger 125 (the compressor may be part of the sparger 125 in some cases).

Some embodiments of the system 100-e include a condenser configured to condense at least the lighter fraction distilled from the distiller 122-b. Some embodiments include a chiller coupled with the condenser.

Some embodiments of the system 100-e include conveyor 105-b that may be configured to convey the compound through the pyrolysis reaction chamber 110-d. The conveyer 105-b may include an auger. In some embodiments, the pyrolysis reaction chamber 110-d includes a tube furnace. In some embodiments of the system 100-e, at least the conveyor 105-b or the pyrolysis reaction chamber 110-d is configured such that the compound has a residence time in the reaction chamber between 10 seconds and 1,000 seconds. In some embodiments, at least the conveyor 105-b or the pyrolysis reaction chamber 110-d is configured such that the compound has a residence time in the reaction chamber of 300 seconds or less. In some embodiments, at least the conveyor 10-b or the pyrolysis reaction chamber 110-d is configured such that the compound has a residence time in the reaction chamber of 120 seconds or less.

In some embodiments of the system 100-e, the pyrolysis reaction includes a hydrous pyrolysis reaction. In some embodiments, the compound includes at least a biomass or a waste product.

Some embodiments of the system 100-e include a dryer 115 that may be configured to dry the compound prior to introduction into the pyrolysis reaction chamber 110-d. The dryer 115 may dry the compound so that it has 10 percent or less water in some embodiments, for example. Some embodiments include a gas flare 145 configured to flare a gas produced from the sparger 125.

Figure 2A:
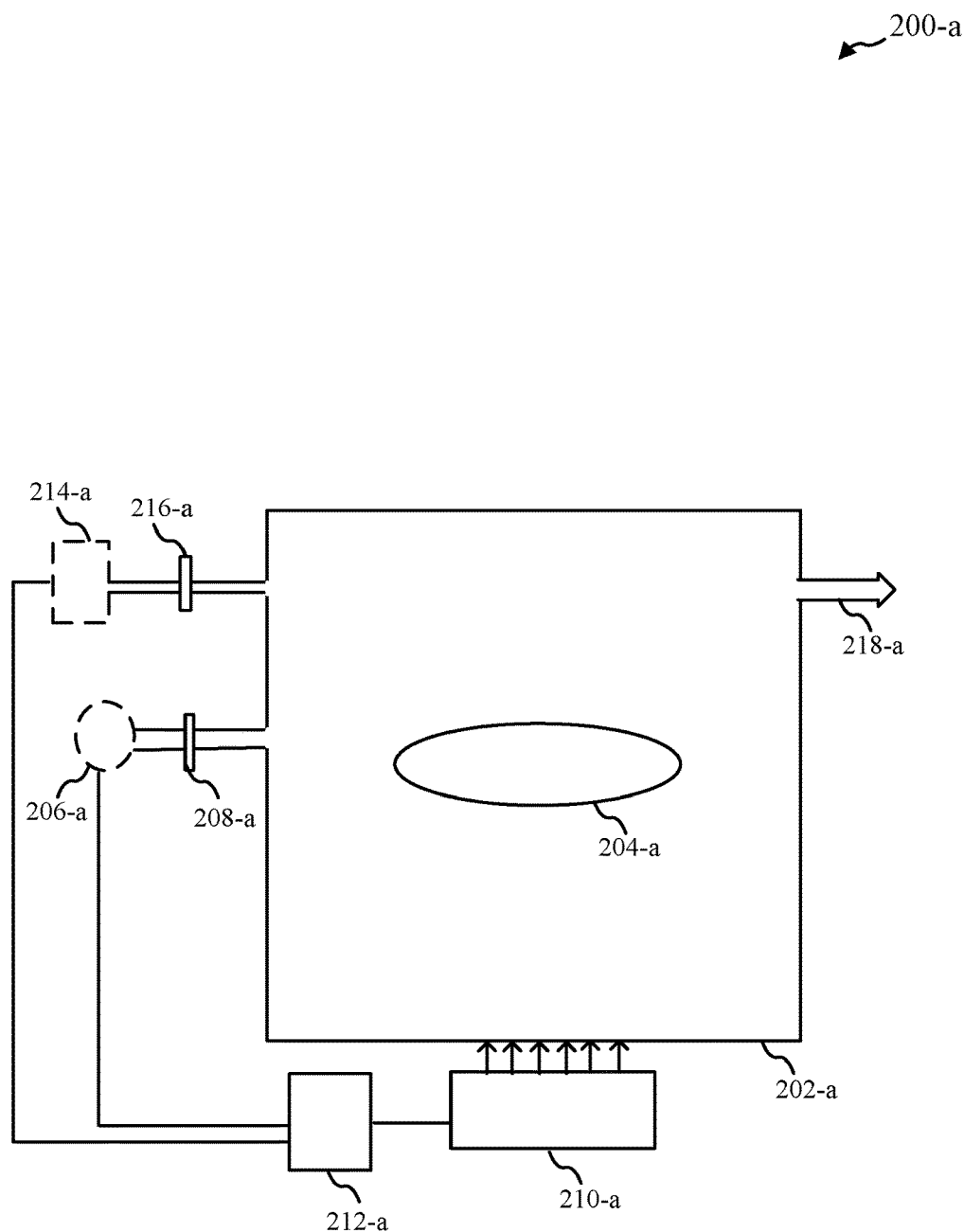
FIG. 2A shows a pyroligneous acid production system in accordance with various embodiments.

Turning now to FIG. 2A, a system 200-a for pyroligneous acid production in accordance with various embodiments is provided. In some embodiments, system 200-a may be an example of aspects of system 100-a of FIG. 1A, system 100-*b* of FIG. 1B, system 100-*c* of FIG. 1C, system 100-*d* of FIG. 1D, and/or system 100-*e* of FIG. 1E. The specific component(s) shown are intended merely to be illustrative. Some embodiments may include other components, not necessarily shown, that may be utilized. Some, but not all of these variants, may be noted in the description that follows.

The system 200-*a* may include a chamber 202-*a*, a heating system 210-*a* in a thermal communication with the chamber 202-*a*, an optional gas supply line 214-*a* for providing inert and/or non-inert gas into the chamber 202-*a*, an optional water supply line 206-*a* for water to be added to the chamber 202-*a* by using optional valve 208-*a*, an exit line 218-*a* to allow the products (such as system generated water and/or pyroligneous acid, for example) to exit the chamber 202-*a* to move into other components (not shown). Components such as chamber 202-*a* may be examples of aspects of non-oxidation reaction chamber 110 of FIG. 1A, pyrolysis reaction chamber 110-*a* of FIG. 1B, the pyrolysis reaction chamber 110-*b* of FIG. 1C, pyrolysis reaction chamber 110-*c* of FIG. 1D, and/or pyrolysis reaction chamber 110-*d* of FIG. 1E.

The COH compound 204-*a* may be disposed within the chamber 202-*a*. Examples of COH compounds 204-*a*, which may be found suitable for methods in accordance with various embodiments may include, but are not limited to, sources of biomass such as cellulose, hemicellulose, and/or sources of lignin, such as found in biomass; some waste streams may be utilized. Some processes may use an inert and/or non-inert gas, which may be admitted to the chamber 202-*a* through one or more valves 216-*a*; the controller 212-*a* may control when to continuously purge chamber 202-*a* with inert and/or non-inert gas by using a valve 216-*a*. The controller 212-*a* may also control the heating system 210-*a* to provide the elevated temperatures that the chamber needs to cause the COH compound 204-*a* to be dissociated and/or reacted in the environment within the chamber 202-*a*. In some embodiments, the heating system 210-*a* may be configured to heat the chamber 202-*a* to at least 700 degrees Celsius; some embodiments may be configured to heat the chamber 202-*a* to at least 800 degrees Celsius; some embodiments may be configured to heat the chamber 202-*a* to at least 900 degrees Celsius, at least 1,000 degrees Celsius, or even at least 1,100 degrees in some cases. In some embodiments, the heating system 210-*a* may be configured to heat the chamber 202-*a* to less than or equal to 1,100 degrees Celsius; for example, a range of temperatures between 800 degrees Celsius and 1,100 degrees Celsius may be utilized. The controller 212-*a* may also control the rate of speed of the insertion of the material containing the COH compound into the chamber 202-*a*. In some embodiments, the controller 212-*a* may further control the temperature of the heating system 210-*a* to heat the COH compound 204-*a* to cause the chemical reaction of the COH compound 204-*a*. Controller 212-*a* may be utilized to control the residence time of the COH compound in the chamber 202-*a*. In some embodiments, the controller 212-*a* may set the residence time such that compound has a residence time in the chamber 202-*a* of between 10 seconds and 1,000 seconds. The compound may have a residence time in the chamber 202-*a* of 300 seconds or less. The compound may have a residence time in the chamber 202-*a* of 120 seconds or less.

During the COH compound processing, the system 200-*a* may run between atmospheric pressure and a slightly greater pressure, which may be up to about 20 torr gage or more in some cases. This may serve to minimize leaks of air in the system and may significantly reduce the risk of an escalating pressure event, such as an explosion.

In some embodiments, the optional water supply line 206-*a* may be configured such that water may be combined with the COH compound to create a wet form of the compound before it is introduced into chamber 202-*a*. Some embodiments may include a conveyor mechanism (not shown) that may be utilized to transfer the wet compound into the chamber 202-*a*. Some conveyor mechanisms may be utilized to convey the COH compound through chamber 202-*a*.

Figure 2B:
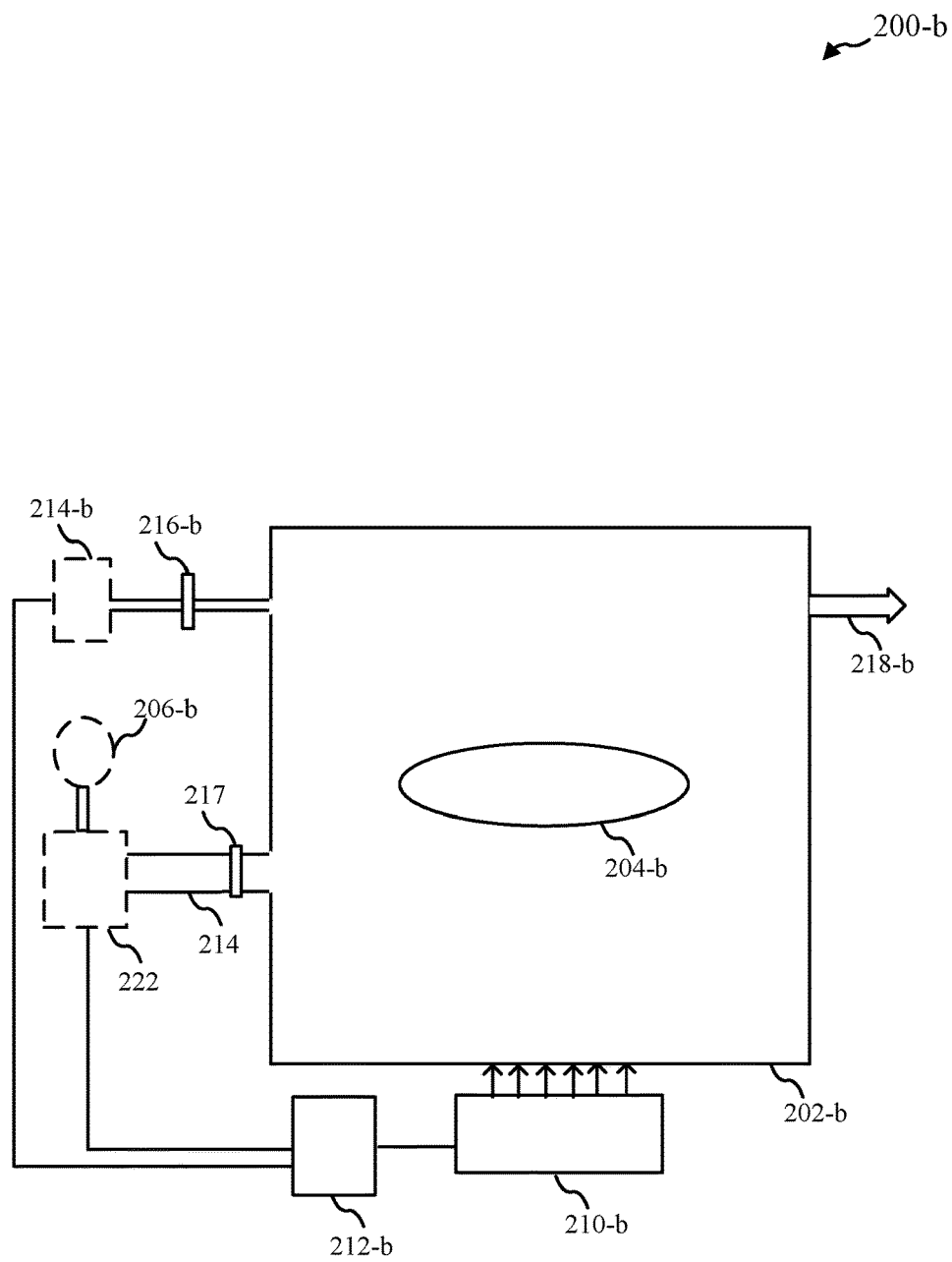
FIG. 2B shows a pyroligneous acid production system in accordance with various embodiments.

A general overview of another simplified system 200-*b* for pyroligneous acid production in accordance with various embodiments is provided with FIG. 2B. In some embodiments, system 200-*b* may be an example of the aspects of system 100-*a* of FIG. 1A, system 100-*b* of FIG. 1B, system 100-*c* of FIG. 1C, system 100-*d* of FIG. 1D, and/or system 100-*e* of FIG. 1E. The specific component(s) shown are intended merely to be illustrative. Some embodiments may include other components, not necessarily shown, that may be utilized. Some, but not all of these variants, may be noted in the description that follows. System 200-*b* may be an example of system 200-*a* of FIG. 2A.

The system 200-*b* may include a chamber 202-*b*, a heating system 210-*b* in a thermal communication with the chamber 202-*b*, an optional gas supply line 214-*b* for providing inert and/or non-inert gas into the chamber 202-*b*, an optional water supply line 206-*b* for water to be added to a COH compound within an optional feed stock hopper or chamber 222, an exit line 218-*b* to allow the products (such as system generated water and/or pyroligneous acid) to exit the chamber 202-*b*, and/or a controller 212-*b*. The COH compound 204-*b* may disposed within the chamber 202-*b*. Examples of COH compounds 204-*b*, which may be wet or dry, that may be found suitable for methods in accordance with various embodiments include, but are not limited to, sources of biomass such as cellulose, hemicellulose, and/or sources of lignin, such as found in biomass. Components such as chamber 202-*b* may be examples of aspects of non-oxidation reaction chamber 110 of FIG. 1A, pyrolysis reaction chamber 110-*a* of FIG. 1B, pyrolysis reaction chamber 110-*b* of FIG. 1C, the pyrolysis reaction chamber 110-*c* of FIG. 1D, and/or the pyrolysis reaction chamber 110-*d* of FIG. 1E.

Some embodiments may utilize processes that may use an inert and/or non-inert gases, admitted to the chamber 202-*b* through one or more valves 216-*b*, which may be controlled by controller 212-*b*. The controller 212-*b* may control when to continuously purge chamber 202-*b* with inert and/or non-inert gases by using a valve 216-*b*, for example. The controller 212-*b* may control the heating system 210-*b* to provide the elevated temperatures within the chamber 202-*b* to cause the COH compound 204-*b* to be dissociated in the environment within the chamber 202-*b*. In some embodiments, the heating system 210-*b* may be configured to heat the chamber 202-*b* to at least 700 degrees Celsius, at least 800 degrees Celsius, at least 900 degrees Celsius, at least 1,000 degrees Celsius, and/or at least 1100 degrees Celsius. In some embodiments, the heating system 210-*b* may be configured to heat the chamber 202-*a* to less than or equal to 1,100 degrees Celsius; for example, a range of temperatures between 700 or 800 degrees Celsius and 1,100 degrees Celsius may be utilized. The controller 212-*b* may also control the rate of speed of the insertion of material containing the COH compound into the chamber 202-*b*. A valve 217 may be utilized in some cases. The controller 212-*b* may further control the temperature of the heating system 210-*b* to heat the COH compound 204-*b* to cause the chemical reaction of the COH compound 204-*b*. Controller 212-*b* may be utilized to control the residence time of the COH compound in the chamber 202-*b*. In some embodiments, the controller 212-*b* may set the residence time such that compound has a residence time in the chamber 202-*b* of between 10 seconds and 1,000 seconds. The compound may have a residence time in the chamber 202-*b* of 300 seconds or less. The compound may have a residence time in the chamber 202-*b* of 120 seconds or less.

During the COH compound processing, the system 200-*b* may run at between atmospheric pressure and a slightly greater pressure, which may be about 20 torr gage or more in some cases. This may serve to minimize leaks in the system and may significantly reduce the risk of an escalating pressure event such as an explosion, for example.

In some embodiments, the optional water supply line 206-*b* may be configured such that water may be combined with the COH compound to create a wet form of the compound before it is introduced into chamber 202-*b*, such as in feedstock hopper or chamber 222. Some embodiments may include a conveyor mechanism 214 that may be utilized to transfer the wet or dry compound into the chamber 202-*b*. The conveyor mechanism 214 may include an auger in some cases. Some embodiments may utilize gravity to help transfer the material containing the COH compound into chamber 202-*b*. In some cases, the material containing the COH compound may be manually transferred into the chamber 202-*b*.

FIG. 2C shows a system 200-*c* for pyroligneous acid production in accordance with various embodiments. System 200-*c* may be an example of aspects of system 100-*a* of FIG. 1A, system 100-*b* of FIG. 1B, system 100-*c* of FIG. 1C, system 100-*d* of FIG. 1D, system 100-*e* of FIG. 1E, system 200-*a* of FIG. 2A, and/or system 200-*b* of FIG. 2B. System 200-*c* may include a tube furnace 110-*e*, which may be an example of the non-oxidation reaction chamber 110 of FIG. 1A, the pyrolysis reaction chamber 110-*a* of FIG. 1B, pyrolysis reaction chamber 110-*b* of FIG. 1C, pyrolysis reaction chamber 110-*c* of FIG. 1D, pyrolysis reaction chamber 110-*d* of FIG. 1E, chamber 202-*a* of FIG. 2A, and/or chamber 202-*b* of FIG. 2B. System 200-*c* may also include an auger 105-*c*, which may be an example of the conveyor 105 of FIG. 1C, the conveyor 105-*a* of FIG. 1D, the conveyor 105-*b* of FIG. 1E, and/or the conveyor mechanism 214 of FIG. 2B. The specific component(s) shown are intended merely to be illustrative. Some embodiments may include other components, not necessarily shown, that may be utilized. Some, but not all of these variants, may be noted in the description that follows.

The tube furnace 110-*e* may be configured to heat a COH compound to a temperature of at least 700 degrees Celsius such that the COH compound reacts through a pyrolysis reaction to produce pyroligneous acid. Some embodiments may be configured such that the tube furnace 110-*e* heats to the COH compound to at least 800 or 900 degrees Celsius; some embodiments may heat the COH compound to at least 1,000 or 1,100 degrees Celsius. In some embodiments, the tube furnace 110-*e* may be configured to heat to less than or equal to 1,100 degrees Celsius; for example, a range of temperatures between 700 or 800 degrees Celsius and 1,100 degrees Celsius may be utilized.

The auger 105-*c* may affect continuous motion of the material containing the COH compound into and through the tube furnace 110-*e*. The auger 105-*c* may include a material composition that may include at least a high-nickel metal alloy, such as a high-nickel steel alloy. In some embodiments, the auger 105-*b* may include multiple different pitches between multiple blades, though some embodiments may utilize a single uniform blade pitch. In some embodiments of system 200-*c*, the tube furnace 110-*e* may include a material composition that may include at least a high-nickel metal alloy, such as a high-nickel steel alloy.

The tube furnace 110-*e* and/or auger 105-*c* may be configured such that the compound has a residence time in the tube furnace 110-*e* of between 10 seconds and 1,000 seconds. The compound may have a residence time in the tube furnace 110-*e* of 300 seconds or less. The compound may have a residence time in the tube furnace 110-*e* of 120 seconds or less.

Figure 2D:
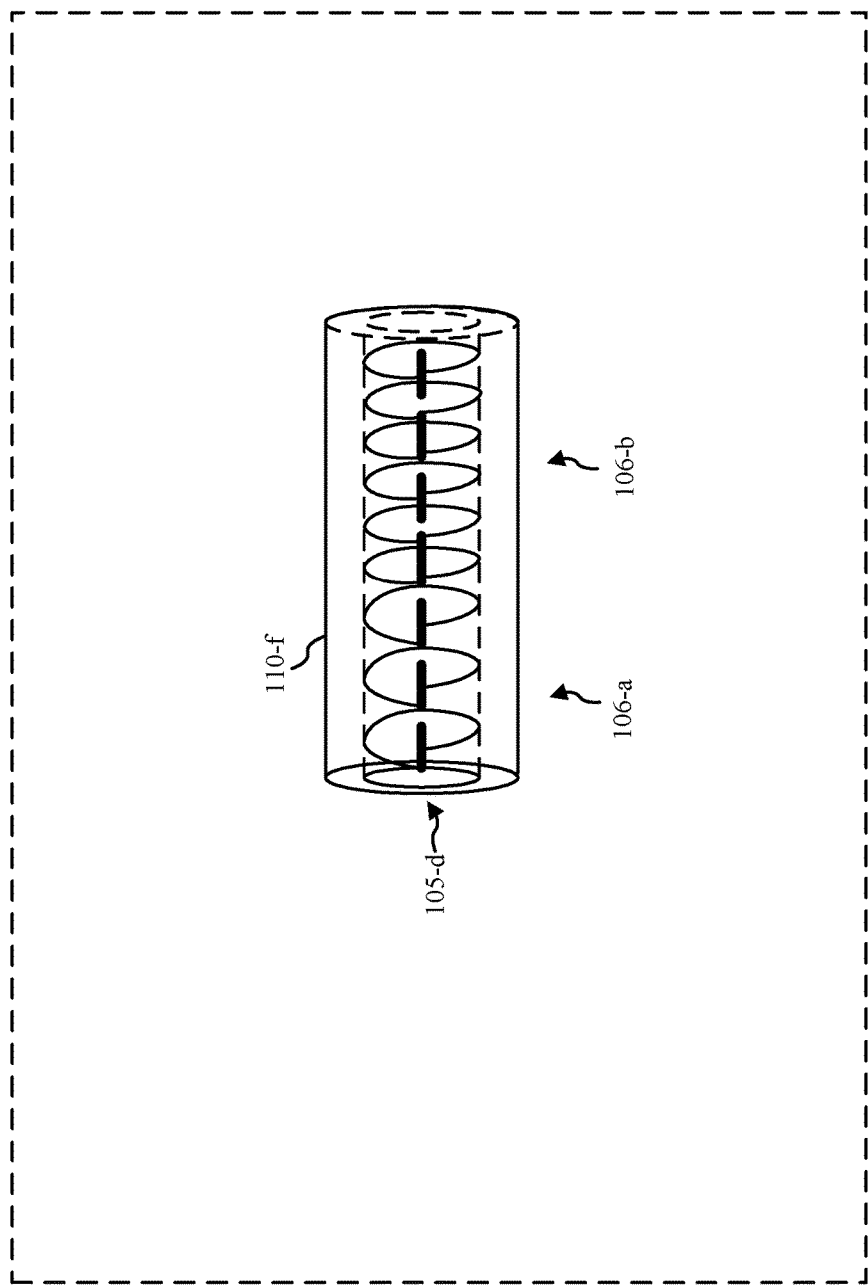
FIG. 2D shows a pyroligneous acid production system in accordance with various embodiments.

FIG. 2D shows another system 200-*d* for pyroligneous acid production in accordance with various embodiments. System 200-*d* may be an example of aspects of system 100-*a* of FIG. 1A, system 100-*b* of FIG. 1B, system 100-*c* of FIG. 1C, system 100-*d* of FIG. 1D, system 100-*e* of FIG. 1E, system 200-*a* of FIG. 2A, system 200-*b* of FIG. 2B, and/or system 200-*c* of FIG. 2C. System 200-*d* may include a tube furnace 110-*f*, which may be an example of the non-oxidation reaction chamber 110 of FIG. 1A, the pyrolysis reaction chamber 110-*a* of FIG. 1B, the pyrolysis reaction chamber 110-*b* of FIG. 1C, the pyrolysis reaction chamber 110-*c* of FIG. 1D, the pyrolysis reaction chamber 110-*d* of FIG. 1E, the chamber 202-*a* of FIG. 2A, the chamber 202-*b* of FIG. 2B, and/or tube furnace 110-*e* of FIG. 2C. System 200-*d* may also include an auger 105-*d*, which may be an example of the conveyor 105 of FIG. 1C, the conveyor 105-*a* of FIG. 1D, the conveyor 105-*b* of FIG. 1E, the conveyor mechanism 114 of FIG. 2B, and/or the auger 105-*c* of FIG. 2C. The specific component(s) shown are intended merely to be illustrative. Some embodiments may include other components, not necessarily shown, that may be utilized. Some, but not all of these variants, may be noted in the description that follows.

The tube furnace 110-*f* may be configured to heat a COH compound to a temperature of at least 700 or 800 degrees Celsius such that the COH compound reacts through a pyrolysis reaction to produce pyroligneous acid. Some embodiments may be configured such that the tube furnace 110-*f* heats to the COH compound to at least 900 degrees Celsius; some embodiments may heat the COH compound to at least 1,000 or 1,100 degrees Celsius. Tube furnace 110-*f* may be configured to heat the COH compound to between 700 and 1,100 degrees Celsius.

The auger 105-*d* may affect continuous motion of the material containing the COH compound into and through the tube furnace 110-*d*. The auger 105-*d* may include a material composition that may include at least a high-nickel metal alloy, such as a high-nickel steel alloy. In some embodiments, the auger 105-*d* may include multiple different pitches between multiple blades. For example, auger 105-*d* may have a first section 106-*a*, which may have blades with a first pitch, and a second section 106-*b* with a second pitch. In this example, the second pitch may be less than the first pitch. This may result in the COH compound having a longer residence time per unit length in the second section 106-*b*, for example. Other variations may be utilized, such as more sections with different pitches. Increasing the pitching of a section may in general decrease the residence time per unit length. In some embodiments, increasing the residence time may be utilized to increase the amount of pyroligneous acid produced. In some cases, decreasing the residence time may be utilized to affect the amount of pyrolysis occurring. In some embodiments of system 200-*d*, the tube furnace 110-*e* may include a material composition that may include at least a high-nickel metal alloy, such as a high-nickel steel alloy.

The tube furnace 110-*f* and/or auger 105-*d* may be configured such that the compound has a residence time in the tube furnace 110-*f* of between 10 seconds and 1,000 seconds. The compound may have a residence time in the tube furnace 110-*f* of 300 seconds or less. The compound may have a residence time in the tube furnace 110-*f* of 120 seconds or less.

Figure 3A:
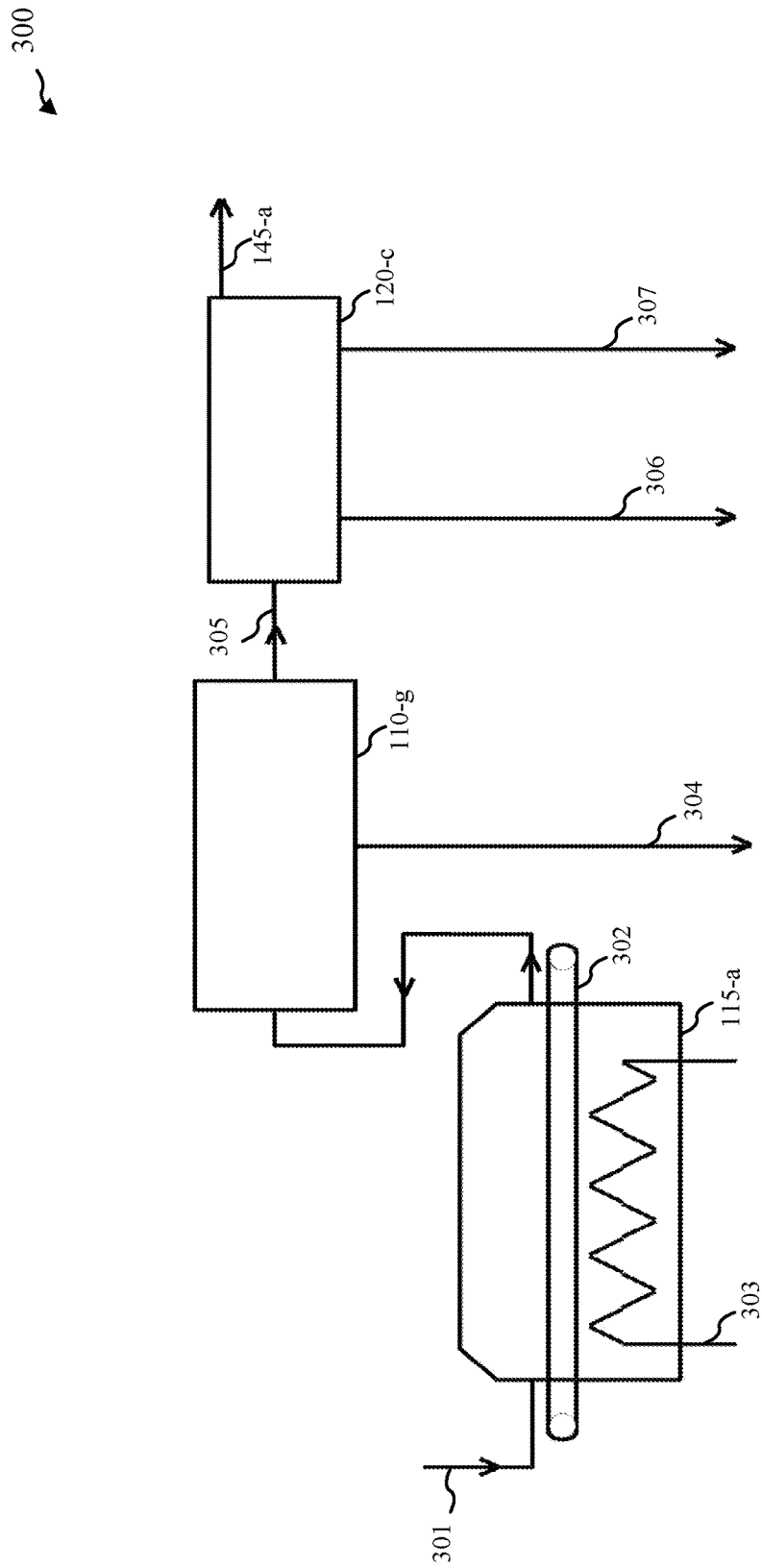
FIG. 3A shows a pyroligneous acid production system in accordance with various embodiments.

FIG. 3A shows a system 300 for pyroligneous acid production in accordance with various embodiments. System 300 may be an example of aspects of system 100-*a* of FIG. 1A, system 100-*b* of FIG. 1B, system 100-*c* of FIG. 1C, system 100-*d* of FIG. 1D, system 100-*e* of FIG. 1E, system 200-*a* of FIG. 2A, system 200-*b* of FIG. 2B, system 200-*c* of FIG. 2C, and/or system 200-*d* of FIG. 2D.

System 300 may include a reaction chamber 110-*g*, which may be an example of the non-oxidation reaction chamber 110 of FIG. 1A, the pyrolysis reaction chamber 110-*a* of FIG. 1B, the pyrolysis reaction chamber 110-*b* of FIG. 1C, the pyrolysis reaction chamber 110-*c* of FIG. 1D, the pyrolysis reaction chamber 110-*d* of FIG. 1E, the chamber 202-*a* of FIG. 2A, the chamber 202-*b* of FIG. 2B, tube furnace 110-*e* of FIG. 2C, and/or tube furnace 110-*f* of FIG. 2D. System 300 may include a dryer 115-*a*, which may be an example of dryer 115 of FIG. 1E. System 300 may include a liquid handling and/or conversion unit(s) 120-*c*, which may an example of a variety of components including, but not limited to, liquid collectors, oil and water separators, distillers, condensers, chillers, filters, spargers, flarers, and/or storage devices. The specific component(s) shown are intended merely to be illustrative. Some embodiments may include other components, not necessarily shown, that may be utilized. Some, but not all of these variants, may be noted in the description that follows.

In general with respect to system 300, a compound 301 that includes carbon, oxygen, and hydrogen may be introduced into dryer 115-*a*; dryer 115-*a* may include one or more tube portions 302 configured to convey the compound for drying. Dryer 115-*a* may include one or more heating elements 303 to facilitate drying of the compound. The dryer 115-*a* may dry the compound so that it has 10 percent or less water in some embodiments.

After being dried, the compound 301 may be conveyed to reaction chamber 110-*g*. As described elsewhere in general, reaction chamber 110-*g* may be configured to heat a compound to a temperature of at least 700 degrees Celsius such that the compound reacts through a pyrolysis reaction to produce pyroligneous acid. Some embodiments may be configured such that the reaction chamber 110-*g* heats to the compound to at least 800 or 900 degrees Celsius; some embodiments may heat the compound to at least 1,000 or 1,100 degrees Celsius. In some embodiments, the reaction chamber 110-*g* may be configured to heat to less than or equal to 1,100 degrees Celsius; for example, a range of temperatures between 700 or 800 degrees Celsius and 1,100 degrees Celsius may be utilized.

After reacting the compound within reaction chamber 110-*g*, a variety of product streams may result. For example, biochar 304 may be produced and/or liquids 305 may be produced. The produced liquids 305 may be direct to liquid handling and/or conversion unit(s) 120-*c*. The liquid handling and/or conversion unit(s) 120-*c* may provide one or more functions. For example, the liquid handling and/or conversion unit(s) 120-*c* may in general handle liquid collection from the reaction chamber 110-*g*. The liquid handling and/or conversion unit(s) 120-*c* may provide for separation, such as separating the produced liquids into an oil and/or sludge component 306 and/or a water component 307. The water component 307 may include pyroligneous acid. In some embodiments, the liquid handling and/or conversion unit(s) 120-*c* may further convert the water component 307 into a lighter and/or heavier fraction utilizing distillation, for example. In some embodiments, the liquid handling and/or conversion unit(s) 120-*c* may produce water gas, which may be flared 145-*a* in some situations.

Figure 3B:
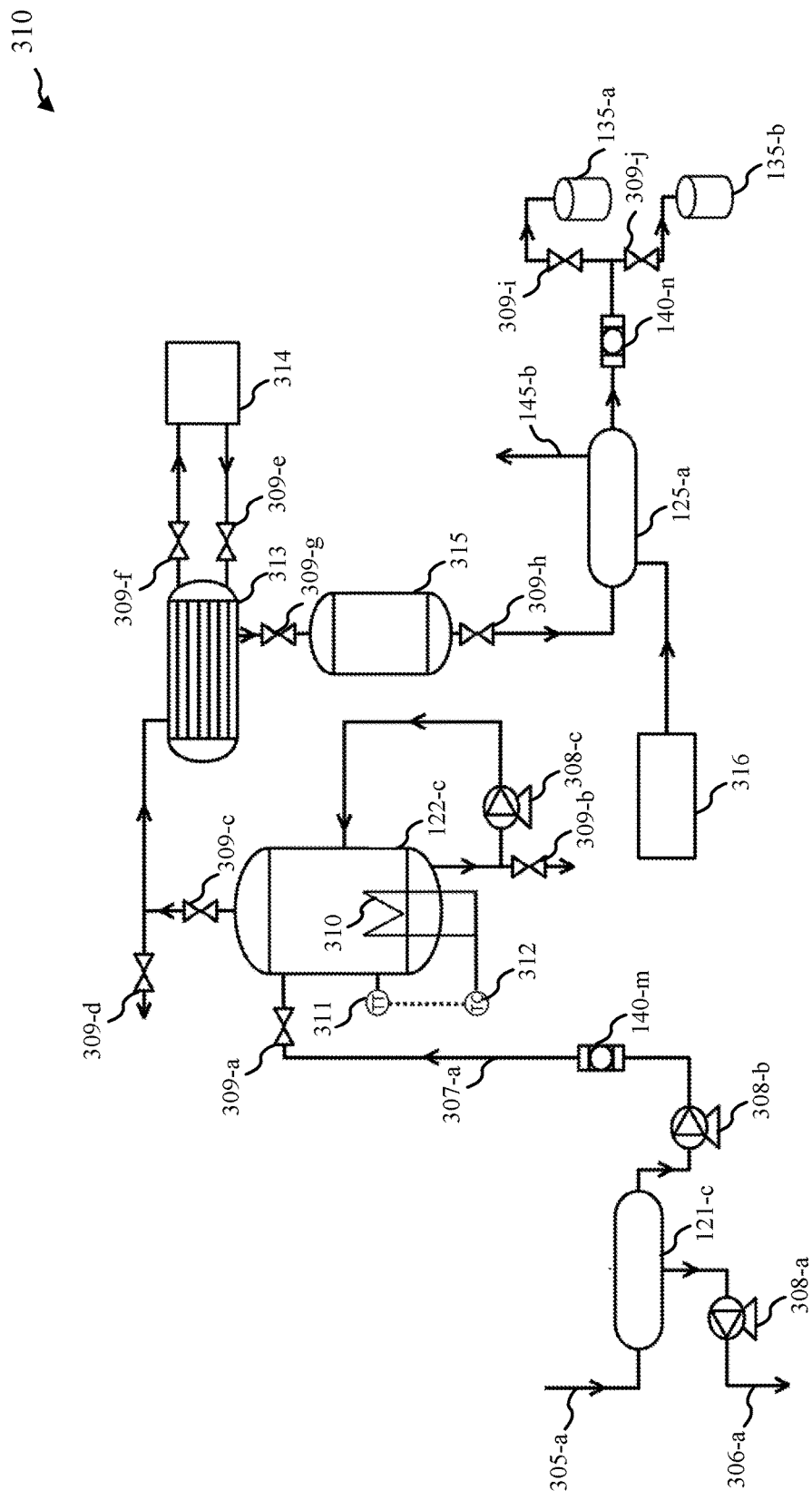
FIG. 3B shows a pyroligneous acid production system in accordance with various embodiments.

FIG. 3B shows a system 310 for pyroligneous acid production in accordance with various embodiments. System 310 may be an example of aspects of system 100-*b* of FIG. 1B, system 100-*c* of FIG. 1C, system 100-*d* of FIG. 1D, system 100-*e* of FIG. 1E, and/or system 300 of FIG. 3A. The specific component(s) shown are intended merely to be illustrative. Some embodiments may include other components, not necessarily shown, that may be utilized. Some, but not all of these variants, may be noted in the description that follows.

System 310 may utilize liquids 305-*a* that may be produced from the variety of reaction chambers discussed above, for example. Liquids 305-*a* may be referred to as process water and/or system water in some cases. The produced liquids 305-*a* may be direct to oil and water separator 121-*c*, which may be an example of the oil and water separator 121 of FIG. 1C, oil and water separator 121-*a* of FIG. 1D, and/or oil and water separator 121-*b* of FIG. 1E. System 310 may include a distiller 122-*c*, which may be an example of distiller 122 of FIG. 1C, distiller 122-*a* of FIG. 1D, and/or distiller 122-*b* of FIG. 1E. The oil and water separator 121-*c* and/or the distiller 122-*c* may be examples of aspects of the liquid collector 120 of FIG. 1B and/or liquid handling and/or conversion unit 120-*c* of FIG. 3A.

The oil and water separator 121-*c* may be positioned before the distiller 122-*c*. The oil and water separator 121-*c* may be configured to separate the collected liquid into an oil component 306-*a* and a water component 307-*a*, where the water component 307-*a* includes the pyroligneous acid. The oil component 306-*a* may also include sludge or be referred to as a sludge component and/or oil and sludge component. Pumps 308-*a* and/or 308-*b* may be utilized to facilitate moving the oil component 306-*a* and/or water component 307-*a* from the oil and water separator 121-*c*.

Some embodiments of the system 310 include one or more filters, such as filter 140-*m* positioned between the oil and water separator 121-*c* and the distiller 122-*c*. Some embodiments include filter 140-*n* positioned after the distiller 122-*c*.

In some embodiments of system 310, valve 309-*a* may be utilized to control the follow of the water component 307-*a* into the distiller 122-*c*. The distiller 122-*c* may be configured to distill a lighter fraction and/or heavier fraction from the water component, where the lighter fraction includes the pyroligneous acid. Distiller 122-*c* may include one or more heaters 310 to facilitate distillation. Temperature monitor 311 and temperature control 312 components may also be utilized. Pump 308-*c* may be utilized to circulate aspects of the water component 307-*a* with respect to distiller 122-*c*. Value 309-*b* may be utilized to control the follow of aspects of the water component 307-*a* from distiller 122-*c*, such as to remove a higher fraction from the distiller 122-*c*.

System 310 may include value 309-*c* to facilitate controlling a flow of aspects of water component 307-*a* from distiller 122-*c*, such as a lighter fraction. Value 309-*d* may allow for aspects of this lighter fraction to be removed from the system or direct to other components, such as condenser 313. Condenser 313 may be configured condense at least the lighter fraction distilled from the distiller 122-*c*. Some embodiments include a chiller 314 coupled with the condenser 313; values 309-*e* and/or 309-*f* may be utilized to facilitate control flow of cooling or condensing fluid between chiller 314 and condenser 314.

Some embodiments of system 310 may include a receiving tank 315 that may receive condensed lighter fraction from condenser 313; a value 309-*g* may control the flow into receiving tank 315. Condensed lighter fraction may also be directed to sparging tank 125-*a*; value 309-*h* may be utilized to control a flow between receiving tank 315 and sparging tank 125-*a*; sparging tank 125-*a* may be referred to as a sparger in some cases. Sparging tank 125-*a* may be configured to receive the lighter fraction, where the lighter fraction includes the pyroligneous acid. Some embodiments include a compressor 316 coupled with the sparging tank 125-*a*. Some embodiments include a gas flare 145-*b* configured to flare a gas produced from the sparging tank 125-*a*.

Some embodiments of system 310 may include one or more storage tanks 135-*a* and/or 135-*b* that may be utilized to store the lighter fraction following sparging from the sparging tank 125-*a*, for example. Values 309-*i* and/or 309-*j* may be utilized to control the follow into the storage tank(s) 135.

Figure 4A:
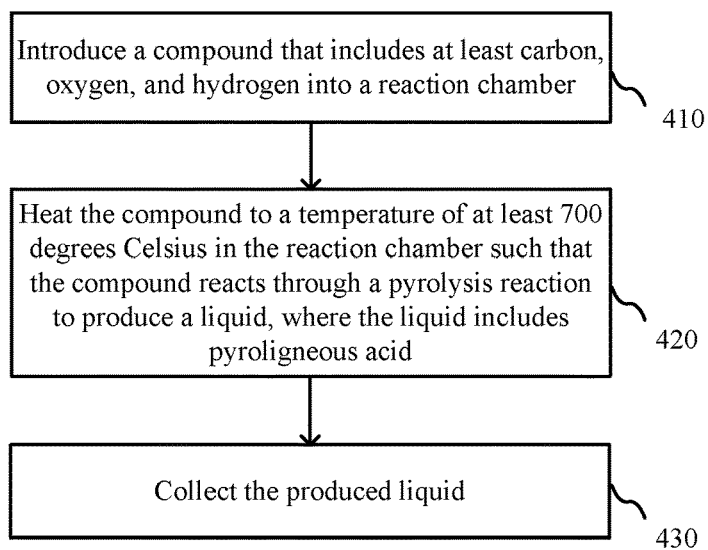
FIG. 4A shows a flowchart for a method of pyroligneous acid production in accordance with various embodiments.

FIG. 4A provides an overview of a flowchart of a method 400 of pyroligneous acid production accordance with various embodiments. Method 400 may be implemented utilizing aspects of system 100-*a* of FIG. 1, system 100-*b* of FIG. 1B, system 100-*c* of FIG. 1C, system 100-*d* of FIG. 1D, system 100-*e* of FIG. 1E, system 200-*a* of FIG. 2A, system 200-*b* of FIG. 2B, system 200-*c* of FIG. 2C, system 200-*d* of FIG. 2D, system 300 of FIG. 3A, and/or system 310 of FIG. 3B. In FIG. 4A, the specific selection of steps shown and the order in which they are shown is intended merely to be illustrative. It is possible for certain steps to be performed in alternative orders, for certain steps to be omitted, and for certain additional steps to be added according to different embodiments of the invention. Some but not all of these variants are noted in the description that follows.

At block 410, a compound that includes at least carbon, oxygen, and hydrogen may be introduced into a reaction chamber. At block 420, the compound may be heated to a temperature of at least 700 degrees Celsius in the reaction chamber such that the compound reacts through a pyrolysis reaction to produce a liquid; the liquid may include pyroligneous acid. At block 430, the produced liquid may be collected.

Some embodiments of method 400 include separating the produced liquid into at least an oil component and a water component, where the water component includes the pyroligneous acid. In some cases, the produced liquid may be referred to as system water. Some embodiments include distilling a lighter fraction from the water component, where the lighter fraction includes the pyroligneous acid.

Some embodiments of method 300 include separating a heavier fraction from the water component. The heavier fraction may be burned or used as a binder in some cases.

In some embodiments of method 300, the water component is filtered. In some embodiments, the lighter fraction is filtered. The filtering may be utilized to remove particulates from the water component and/or lighter fraction, for example.

Heating the compound in the reaction chamber may include utilizing a temperature of at least 800 degrees Celsius, of at least 900 degrees Celsius, or at least 1,000 degrees Celsius, or at least 1,100 degrees Celsius. In some embodiments, a temperature of less than or equal to 1,100 degrees Celsius may be utilized; for example, a range of temperatures between 700 or 800 degrees Celsius and 1,100 degrees Celsius may be utilized.

In some embodiments, the compound has a residence time in the reaction chamber of between 10 seconds and 1,000 seconds. The compound may have a residence time in the reaction chamber of 300 seconds or less. The compound may have a residence time in the reaction chamber of 120 seconds or less.

In some embodiments of method 400, the pyrolysis reaction includes a hydrous pyrolysis reaction. In some embodiments, the compound includes a wet compound formed from mixing the compound with water outside the reaction chamber.

In some embodiments of method 400, the compound includes at least a biomass or a waste product.

Some embodiments of method 400 include drying the compound prior to introducing the compound into the reaction chamber. Drying the compound may reduce a water content of the compound to 10 percent or less.

Some embodiments of method 400 adding a surfactant to the water component. The surfactant may be added to the water component to reduce bubbling in the water component as it is distilled, for example. Some embodiments of method 400 include sparging the distilled lighter fraction, wherein the distilled lighter fraction includes the pyroligneous acid. Some embodiments may utilize compressed air with respecting to the sparging. The sparging may help remove different compounds, such as benzene and/or toluene, from the lighter fraction, for example. Some embodiments include flaring a gas produced from sparging the distilled lighter fraction, wherein the gas includes at least benzene or toluene.

As noted, the produced pyroligneous acid of method 400 may be part of a lighter fraction. The lighter fraction may include a mixture of water and various oxygenated chemicals that may be derived from thermal decomposition of COH compounds in the absence of air or oxygen. The liquids produced in accordance with various embodiments may have benefits over other forms of produced pyroligneous acid. For example, the produced liquids may include less cyanide then other forms of produced pyroligneous acid. For example, the amount cyanide may be less than 50 ppm; in some produced lighter fractions in accordance with various embodiments, the amount of cyanide is less than 20 ppm. In some embodiments, the amount of cyanide may be between 5 and 30 ppm. In some embodiments, cyanide that may be produced may be concentrated in a higher fraction through distillation, which may result in a lighter fraction with less or no detectable cyanide.

Other general characteristics of the pyroligneous acid, which may be part of the lighter fraction, produced in accordance with various embodiments include the following. Some embodiments include pH between 2.2 and 3.5. Some embodiments include total acid number between 20 and 35 mgKOH/g of sample. Some embodiments may have a density of approximately 1.01 gm/l. Some embodiments may have a flash point greater than 100 degrees Celsius. Some embodiments may have a total suspended solid content of less than 25 ppm.

Merely by way of example, a chemical composition of some embodiments of the lighter fraction, with respect to mass percentage, may be the following: 94-98% water, 0.2-0.4% acetic acid, 0.1-0.3% other acids, 1-2.5% furfural, 0.6-1.2% other aldehydes/ketones, 1-2% phenol and substituted phenols, 0.08% or lower other oxygenated compounds, and/or 0.01% or less of alkanes/alkenes. PAH and/or BTEX levels may not be detected. Other embodiments may include other chemical compositions.

As noted, some embodiments of method 400 may also produce a heavier fraction. The heavier fraction may be referred to as pyrolysis liquid bottoms, pyroligneous acid bottoms, wood vinegar distillate bottoms, and/or liquid wood bottoms, for example. The heavier fraction may include a mixture of water and various oxygenated chemicals that may be derived by the thermal decomposition of different compounds in the absence of air or oxygen, for example. Some embodiments of the heavier fraction include pH between 2.2 and 3.5. Some embodiments include total acid number between 20 and 35 mgKOH/g of sample. Some embodiments may have a density of approximately 1.01 gm/l. Some embodiments may have a flash point greater than 100 degrees Celsius. Some embodiments may have a total suspended solid content between 1,200 and 2,000 mg/L. Some embodiments may include cyanide between 300 and 1,000 ppm.

Merely by way of example, a chemical composition of some embodiments of the heavier fraction, with respect to mass percentage, may be the following: 92-98% water, 0.1% or less of acetic acid, 0.5% or less of other acids, 0.06% or less of furfural, 0.1-1.0% other aldehydes/ketones, 0.9-1.5% phenol and substituted phenols, 0.5-2.5% other oxygenated compounds, and/or undetectable amounts of alkanes/alkenes. PAH and/or BTEX levels may not be detected. Other embodiments may include other chemical compositions.

The produced lighter fraction and/or heavier fraction may be utilized for a variety of purposes. For example, the lighter fraction may be utilized as food flavoring, such as liquid smoke. The lighter fraction may be utilized for other purposes including, but not limited to, plant food, herbicide, insecticide, insect repellent, wood preservative, and/or feedstuff amendment. The lighter fraction may be diluted in some cases for different applications. For example, the lighter fraction may be diluted 1 to 1 or 1 to 100, though other dilution factors may be utilized. The heavier fraction may be utilized for a variety of purposes including, but limited to, a binder, a plant food, and/or insecticide. The heavier fraction may be diluted in some applications. For example, dilutions of 1 to 100 may be utilized, though other dilutions factors may be utilized.

Figure 4B:
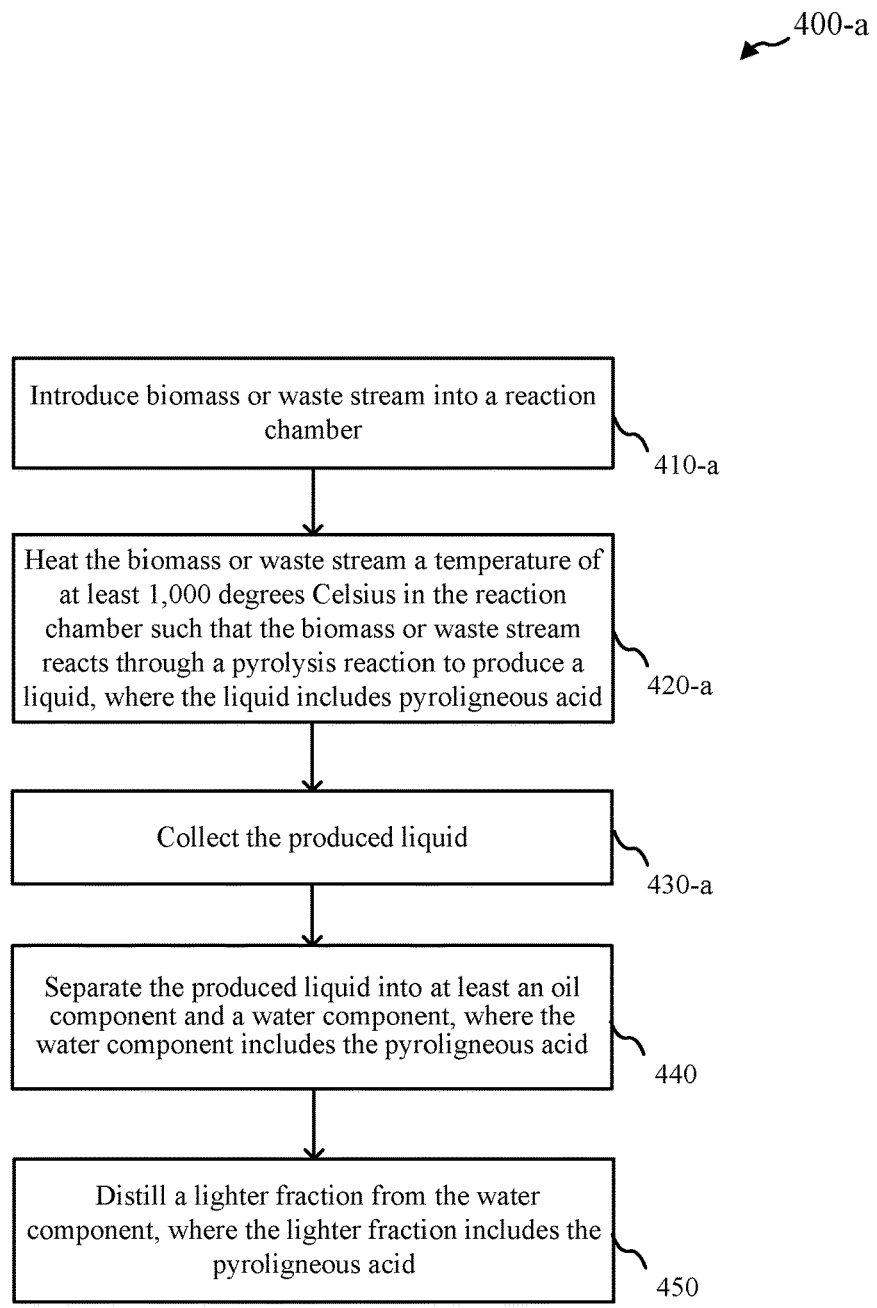
FIG. 4B shows a flowchart for a method of a pyroligneous acid production in accordance with various embodiments.

FIG. 4B provides an overview of a flowchart of a method 400-a of pyroligneous acid production accordance with various embodiments. Method 400-a may be implemented utilizing aspects of system 100-a of FIG. 1, system 100-b of FIG. 1B, system 100-c of FIG. 1C, system 100-d of FIG. 1D, system 100-e of FIG. 1E, system 200-a of FIG. 2A, system 200-b of FIG. 2B, system 200-c of FIG. 2C, system 200-d of FIG. 2D, system 300 of FIG. 3A, and/or system 310 of FIG. 3B, for example. In FIG. 4B, the specific selection of steps shown and the order in which they are shown is intended merely to be illustrative. It is possible for certain steps to be performed in alternative orders, for certain steps to be omitted, and for certain additional steps to be added according to different embodiments of the invention. Some but not all of these variants are noted in the description that follows. Method 400-a may be an example of aspects of method 400 of FIG. 4A.

At block 410-a, a biomass or waste stream may be introduced into a reaction chamber. At block 420-a, the biomass or waste stream may be heated to a temperature of at least 1,000 degrees Celsius in the reaction chamber such that the biomass reacts through a pyrolysis reaction to produce a liquid, where the liquid includes pyroligneous acid. At block 430-a, the produced liquid may be collected. At block 440, the produced liquid may be separated into at least an oil component and a water component, where the water component includes the pyroligneous acid. At block 450, a lighter fraction may be distilled from the water component, where the lighter component includes the pyroligneous acid.

Figure 4C:
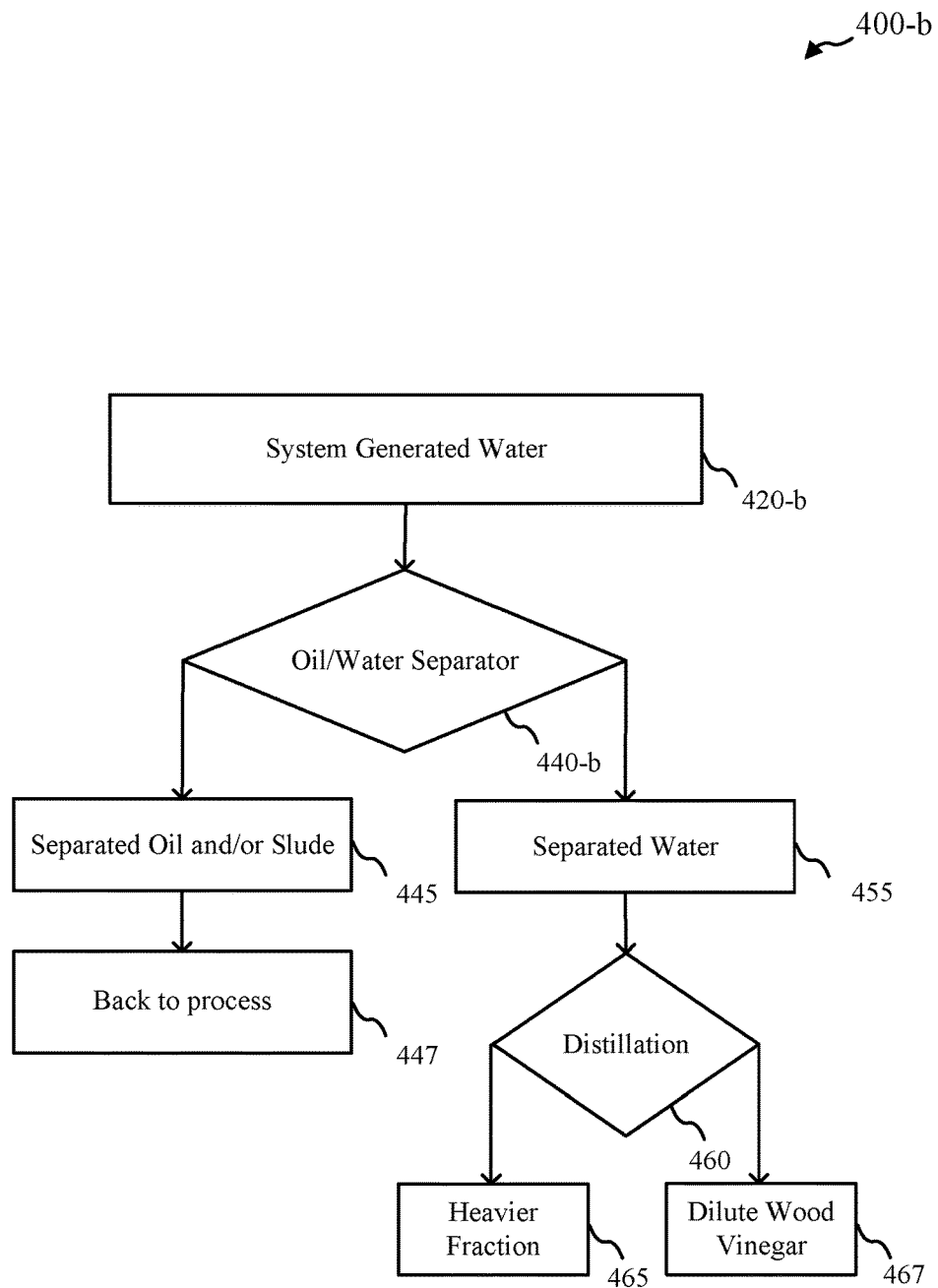
FIG. 4C shows a flowchart for a method of a pyroligneous acid production in accordance with various embodiments.

FIG. 4C provides an overview of a flowchart of a method 400-b of pyroligneous acid production accordance with various embodiments. Method 400-b may be implemented utilizing aspects of system 100-a of FIG. 1, system 100-b of FIG. 1B, system 100-c of FIG. 1C, system 100-d of FIG. 1D, system 100-e of FIG. 1E, system 200-a of FIG. 2A, system 200-b of FIG. 2B, system 200-c of FIG. 2C, system 200-d of FIG. 2D, system 300 of FIG. 3A, and/or system 310 of FIG. 3B, for example. In FIG. 4C, the specific selection of steps shown and the order in which they are shown is intended merely to be illustrative. It is possible for certain steps to be performed in alternative orders, for certain steps to be omitted, and for certain additional steps to be added according to different embodiments of the invention. Some but not all of these variants are noted in the description that follows. Method 400-b may be an example of aspects of method 400 of FIG. 4A and/or method 400-a of FIG. 4B.

At block 420-b, system generated water may be produced and/or collected. The system generated water may include pyroligneous acid. At block 440-b, the system generated water may be separated utilizing an oil and water separator. One component that may be separated may include separated oil and/or sludge as shown in block 445; this may be referred to as the oil component in some cases. Another component that may be separated may include separated water as shown in block 455; this may be referred to as the water component, which may include pyroligneous acid. In block 447, the separated oil and/or sludge may be sent back to the process system that generated the oil and/or sludge. At block 460, the separated water component may be subjected to fractional distillation. From the fractional distillation, a heavier fraction may be produced as shown in block 465; a dilute wood vinegar or lighter fraction may also be produced as shown in block 467. In some case, the heavier fraction may constitute approximately 5 to 30 percent of the water component, while the lighter fraction or dilute wood vinegar may constitute approximately 70 to 95 percent of the water component. In some cases, the heavier fraction may be burned, though in some cases it may be utilized as a binder. Merely by way of example, if the heavier fraction may constitute around 5% of the water component, it may be utilized as a binder; if the heavier fraction may constitute around 30% of the water component, it may be burned. The heavier fraction and/or lighter fraction may be utilized for other purposes.

Figure 4D:
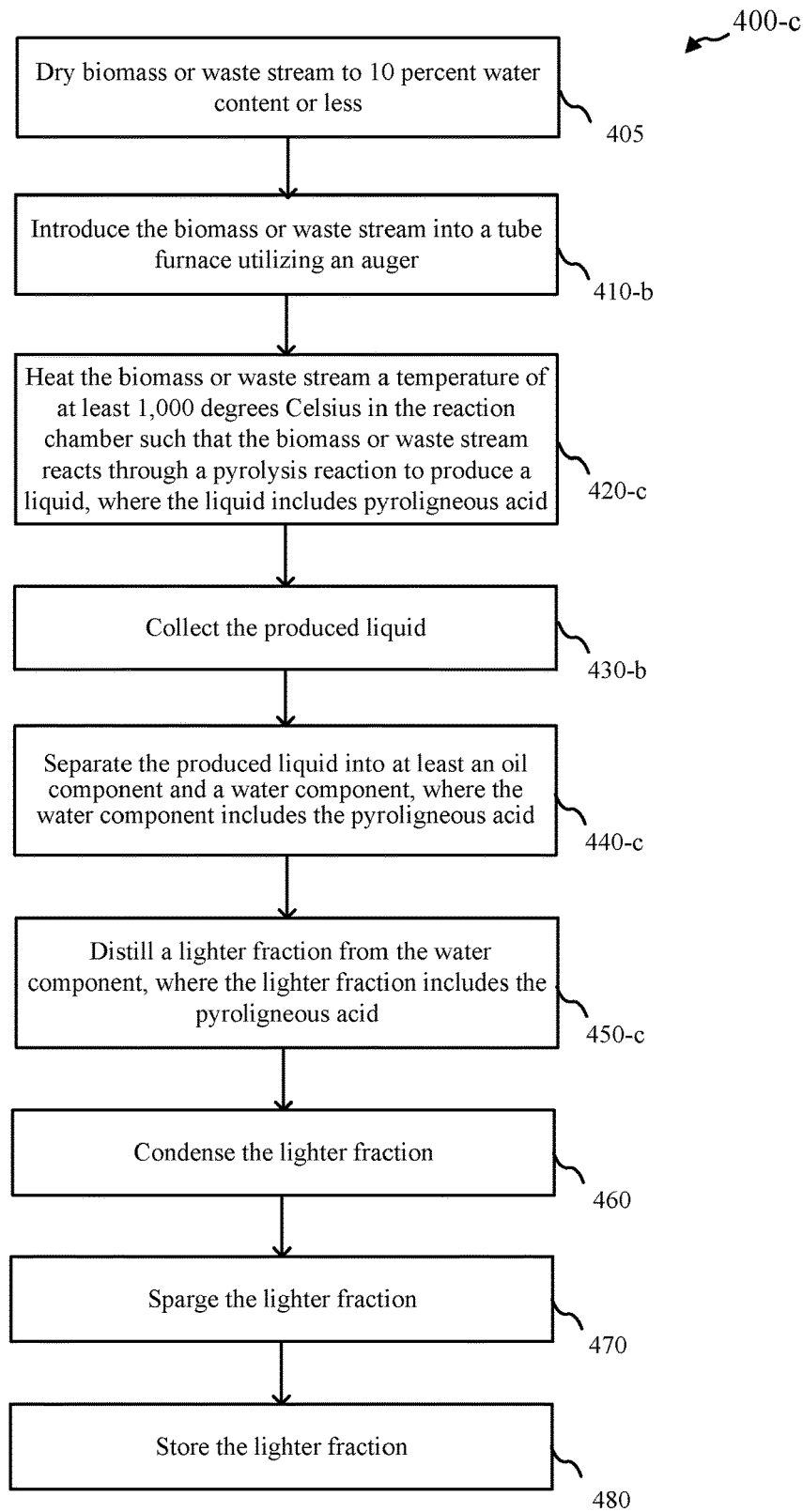
FIG. 4D shows a flowchart for a method of a pyroligneous acid production in accordance with various embodiments.

FIG. 4D provides an overview of a flowchart of a method 400-c of pyroligneous acid production accordance with various embodiments. Method 400-c may be implemented utilizing aspects of system 100-a of FIG. 1, system 100-b of FIG. 1B, system 100-c of FIG. 1C, system 100-d of FIG. 1D, system 100-e of FIG. 1E, system 200-a of FIG. 2A, system 200-b of FIG. 2B, system 200-c of FIG. 2C, system 200-d of FIG. 2D, system 300 of FIG. 3A, and/or system 310 of FIG. 3B, for example. In FIG. 4D, the specific selection of steps shown and the order in which they are shown is intended merely to be illustrative. It is possible for certain steps to be performed in alternative orders, for certain steps to be omitted, and for certain additional steps to be added according to different embodiments of the invention. Some but not all of these variants are noted in the description that follows. Method 400-c may be an example of aspects of method 400 of FIG. 4A, method 400-a of FIG. 4B, and/or method 400-b of FIG. 4C.

At block 405, biomass or waste stream may be dried to 10 percent water content of less. At block 410-b, the biomass or waste stream may be introduced into a tube furnace utilizing an auger. At block 420-c, the biomass or waste stream may be heated a temperature of at least 1,000 degrees Celsius in the reaction chamber such that the biomass or waste stream reacts through a pyrolysis reaction to produce a liquid, where the liquid includes pyroligneous acid. At block 430-b, the produced liquid may be collected. At block 440-c, the produced liquid may be separated into at least an oil component and a water component, where the water component includes the pyroligneous acid. At block 450-c, a lighter fraction may be distilled from the water component, where the lighter fraction includes the pyroligneous acid. At block 460, the lighter fraction may be condensed. At block 470, the lighter fraction may be sparged. At block 480, the lighter fraction may be stored.

While detailed descriptions of one or more embodiments have been given above, various alternatives, modifications, and equivalents will be apparent to those skilled in the art without varying from the spirit of the different embodiments. Moreover, except where clearly inappropriate or otherwise expressly noted, it should be assumed that the features, devices, and/or components of different embodiments may be substituted and/or combined. Thus, the above description should not be taken as limiting the scope of the different embodiments, which may be defined by the appended claims.

What is claimed is:

1. A method of pyroligneous acid production comprising:
   introducing a compound that includes at least carbon, oxygen, and hydrogen into a reaction chamber;
   heating the compound to a temperature of at least 700 degrees Celsius in the reaction chamber such that the compound reacts through a pyrolysis reaction to produce a liquid, wherein the liquid includes pyroligneous acid;
   collecting the produced liquid;
   separating the produced liquid into at least an oil component and a water component, wherein the water component includes a portion of the pyroligneous acid;
   distilling a lighter fraction from the water component, wherein the lighter fraction includes a portion of the pyroligneous acid;
   sparging the distilled lighter fraction, wherein the distilled lighter fraction includes a portion of the pyroligneous acid; and
   flaring a gas produced from sparging the distilled lighter fraction, wherein the gas includes at least benzene or toluene.

2. The method of claim 1, further comprising distilling a heavier fraction from the water component.

3. The method of claim 2, further comprising burning the heavier fraction.

4. The method of claim 2, further comprising utilizing the heavier fraction as a binder.

5. The method of claim 1, wherein the temperature is at least 800 degrees Celsius.

6. The method of claim 5, wherein the temperature is at least 900 degrees Celsius.

7. The method of claim 6, wherein the temperature is at least 1,000 degrees Celsius.

8. The method of claim 7, wherein the temperature is less than or equal to 1,100 degrees Celsius.

9. The method of claim 1, wherein the compound has a residence time in the reaction chamber between 10 seconds and 1,000 seconds.

10. The method of claim 9, wherein the compound has a residence time in the reaction chamber of 300 seconds or less.

11. The method of claim 10, wherein the compound has a residence time in the reaction chamber of 120 seconds or less.

12. The method of claim 1, wherein the pyrolysis reaction includes a hydrous pyrolysis reaction.

13. The method of claim 1, wherein the compound includes at least a biomass or a waste product.

14. The method of claim 1, further comprising filtering the water component.

15. The method of claim 1, further comprising filtering the lighter fraction.

16. The method of claim 1, further comprising drying the compound prior to introducing the compound into the reaction chamber.

17. The method of claim 16, wherein drying the compound reduces a water content of the compound to 10 percent or less.

18. The method of claim 1, wherein the compound includes a wet compound formed from mixing the compound with water outside the reaction chamber.

19. A method of pyroligneous acid production comprising:
   introducing a compound that includes at least carbon, oxygen, and hydrogen into a reaction chamber;
   heating the compound to a temperature of at least 700 degrees Celsius in the reaction chamber such that the compound reacts through a pyrolysis reaction to produce a liquid, wherein the liquid includes pyroligneous acid;
   collecting the produced liquid;
   separating the produced liquid into at least an oil component and a water component, wherein the water component includes a portion of the pyroligneous acid; and
   adding a surfactant to the water component.

* * * * *